US011190781B2

(12) United States Patent
Sarwer et al.

(10) Patent No.: US 11,190,781 B2
(45) Date of Patent: Nov. 30, 2021

(54) ADAPTIVE RESOLUTION CHANGE IN VIDEO PROCESSING

(71) Applicant: ALIBABA GROUP HOLDING LIMITED, Grand Cayman (KY)

(72) Inventors: Mohammed Golam Sarwer, San Mateo, CA (US); Jiancong Luo, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/887,103

(22) Filed: May 29, 2020

(65) Prior Publication Data

US 2020/0404297 A1 Dec. 24, 2020

Related U.S. Application Data

(60) Provisional application No. 62/865,927, filed on Jun. 24, 2019, provisional application No. 62/900,439, filed on Sep. 13, 2019.

(51) Int. Cl.
*H04N 19/30* (2014.01)
*H04N 19/105* (2014.01)
(Continued)

(52) U.S. Cl.
CPC ............ *H04N 19/30* (2014.11); *H04N 19/105* (2014.11); *H04N 19/132* (2014.11); *H04N 19/172* (2014.11); *H04N 19/423* (2014.11)

(58) Field of Classification Search
CPC .... H04N 19/30; H04N 19/105; H04N 19/172; H04N 19/423; H04N 19/132; H04N 19/573; H04N 19/70; H04N 19/428
(Continued)

(56) References Cited

U.S. PATENT DOCUMENTS

2010/0150231 A1* 6/2010 Huang .................. H04N 19/59
375/240.12
2012/0314771 A1* 12/2012 Lim ..................... H04N 19/117
375/240.16
(Continued)

FOREIGN PATENT DOCUMENTS

WO WO 2018/002425 A2 1/2018
WO WO 2018/178507 A1 10/2018

OTHER PUBLICATIONS

PCT International Search Report and Written Opinion dated Aug. 27, 2020, issued in corresponding International Application No. PCT/US2020/035079 (12 pgs.).
(Continued)

*Primary Examiner* — Susan E. Hodges
(74) *Attorney, Agent, or Firm* — Finnegan, Henderson, Farabow, Garrett & Dunner, LLP

(57) ABSTRACT

The present disclosure provides systems and methods for performing adaptive resolution change during video encoding and decoding. The methods include: comparing resolutions of a target picture and a first reference picture; in response to the target picture and the first reference picture having different resolutions, resampling the first reference picture to generate a second reference picture; and encoding or decoding the target picture using the second reference picture.

18 Claims, 31 Drawing Sheets

(51) Int. Cl.
*H04N 19/132* (2014.01)
*H04N 19/172* (2014.01)
*H04N 19/423* (2014.01)

(58) Field of Classification Search
USPC .............................................. 375/240.21, 240
See application file for complete search history.

(56) References Cited

U.S. PATENT DOCUMENTS

| | | | |
|---|---|---|---|
| 2013/0107953 A1 | 5/2013 | Chen et al. | |
| 2014/0146137 A1 | 5/2014 | Yea et al. | |
| 2014/0269912 A1 | 9/2014 | Sullivan | |
| 2015/0010062 A1 | 1/2015 | Gokhale et al. | |
| 2015/0350726 A1 | 12/2015 | Tan | |
| 2016/0165260 A1* | 6/2016 | Lee | H04N 19/176 375/240.12 |
| 2017/0310972 A1* | 10/2017 | Wang | H04N 19/105 |
| 2018/0262753 A1 | 9/2018 | Sugio et al. | |
| 2018/0288417 A1 | 10/2018 | Jung et al. | |
| 2019/0297339 A1* | 9/2019 | Hannuksela | H04N 19/176 |

OTHER PUBLICATIONS

Sullivan et al., "Overview of the High Efficiency Video Coding (HEVC) Standard," IEE Transactions on Circuits and Systems for Video Technology, vol. 22, No. 12, pp. 1649-1668 (2012).

Ohm et al., "High Efficiency Video Coding: The Next Frontier in Video Compression," IEEE Signal Processing Magazine, pp. 152-158 (2013).

"Requirements for a Future Video Coding Standard v5," International Organisation for Standardisation, 13 pages (2017).

Dong et al., "Downsampling filters for anchor generation for scalable extensions of HEVC," International Organisation for Standardisation, Interdigital Communications, LLC, 4 pages (2012).

Chen et al., "AHG8: Integrated Specification Text for Reference Picture Resampling," JVET-O1164, 15$^{th}$ Meeting: Gothenburg, SE, 1 page (2019).

Chen et al., "Algorithm description for Versatile Vide Coding and Test Model 5 (VTM 5)," JVET-N1002-v2, 14$^{th}$ Meeting: Geneva, CH, 76 pages (2019).

Chen et al., "AHG 19: Adaptive Resolution Change," JVET-N0279, 14th Meeting: Geneva, CH, 6 pages (2019).

Chen et al., "Algorithm Description of Joint Exploration Test Model 7 (JEM 7)," JVET-G1001-v1, 7$^{th}$ Meeting: Torino, IT (2017).

* cited by examiner

Table 1: Sub-Pel Motion Compensation Interpolation Filter Used For Luma Component In VVC

| Fractional sample position p | Motion compensation interpolation filter coefficients for Luma | | | | | | | |
|---|---|---|---|---|---|---|---|---|
| | fL[ p ][ 0 ] | fL[ p ][ 1 ] | fL[ p ][ 2 ] | fL[ p ][ 3 ] | fL[ p ][ 4 ] | fL[ p ][ 5 ] | fL[ p ][ 6 ] | fL[ p ][ 7 ] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | 0 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

FIG. 4

Table 2: Sub-Pel Motion Compensation Interpolation Filter Used For Chroma Component In VVC

| Fractional sample position p | interpolation filter coefficients for Chroma | | | |
|---|---|---|---|---|
| | fc[ p ][ 0 ] | fc[ p ][ 1 ] | fc[ p ][ 2 ] | fc[ p ][ 3 ] |
| 0 | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

FIG. 5

Table 3: An Example Of A Supported Resolution Set When N = 3

| Index | 0 | 1 | 2 |
|---|---|---|---|
| Resolution | 1920x1080 | 1440x816 | 960x540 |

FIG. 7

Table 4: Downsampling Filter

| Fractional sample position p | Down sampling filter | | | | | | | | | | | | |
|---|---|---|---|---|---|---|---|---|---|---|---|---|---|
| | f_t[0] | f_t[1] | f_t[2] | f_t[3] | f_t[4] | f_t[5] | f_t[6] | f_t[7] | f_t[8] | f_t[9] | f_t[10] | f_t[11] | f_t[12] |
| 0 | 0 | 0, | 5, | -6, | -10, | 37, | 76, | 37, | -10, | -6, | 5, | 0, | 0} |
| 1 | 0 | -1, | 5, | -3, | -12, | 29, | 75, | 45, | -7, | -8, | 5, | 0, | 0 |
| 2 | 0 | -1, | 4, | -1, | -13, | 22, | 73, | 52, | -3, | -10, | 4, | 1, | 0 |
| 3 | 0 | -1, | 4, | 1, | -13, | 14, | 70, | 59, | 2, | -12, | 3, | 2, | -1 |
| 4 | 0 | -1, | 3, | 2, | -13, | 8, | 65, | 65, | 8, | -13, | 2, | 3, | -1 |
| 5 | 0 | -1, | 2, | 3, | -12, | 2, | 59, | 70, | 14, | -13, | 1, | 4, | -1 |
| 6 | 0 | 0, | 1, | 4, | -10, | -3, | 52, | 73, | 22, | -13, | -1, | 4 | -1 |
| 7 | 0 | 0, | 0, | 5, | -8, | -7, | 45, | 75, | 29, | -12, | -3 | 5 | -1 |

FIG. 11

Table 5: 6-tap filters

| Fractional sample position p | 6-tap interpolation filter coefficients for luma 4x4 block in VVC | | | | | |
|---|---|---|---|---|---|---|
| | p0 | p1 | p2 | p3 | p4 | p5 |
| 0 | 0 | 0 | 64 | 0 | 0 | 0 |
| 1 | 1 | -3 | 63 | 4 | -2 | 1 |
| 2 | 1 | -5 | 62 | 8 | -3 | 1 |
| 3 | 2 | -8 | 60 | 13 | -4 | 1 |
| 4 | 3 | -10 | 58 | 17 | -5 | 1 |
| 5 | 3 | -11 | 52 | 26 | -8 | 2 |
| 6 | 2 | -9 | 47 | 31 | -10 | 3 |
| 7 | 3 | -11 | 45 | 34 | -10 | 3 |
| 8 | 3 | -11 | 40 | 40 | -11 | 3 |
| 9 | 3 | -10 | 34 | 45 | -11 | 3 |
| 10 | 3 | -10 | 31 | 47 | -9 | 2 |
| 11 | 2 | -8 | 26 | 52 | -11 | 3 |
| 12 | 1 | -5 | 17 | 58 | -10 | 3 |
| 13 | 1 | -4 | 13 | 60 | -8 | 2 |
| 14 | 1 | -3 | 8 | 62 | -5 | 1 |
| 15 | 1 | -2 | 4 | 63 | -3 | 1 |

FIG. 13

Table 6: 8-tap filters

| Fractional sample position p | 8-tap interpolation filter coefficients for luma in VVC | | | | | | | |
|---|---|---|---|---|---|---|---|---|
| | p0 | p1 | p2 | p3 | p4 | p5 | p6 | p7 |
| 0 | 0 | 0 | 0 | 64 | 0 | 0 | 0 | 0 |
| 1 | 0 | 1 | -3 | 63 | 4 | -2 | 0 | 1 |
| 2 | -1 | 2 | -5 | 62 | 8 | -3 | -1 | 2 |
| 3 | -1 | 3 | -8 | 60 | 13 | -4 | -1 | 3 |
| 4 | -1 | 4 | -10 | 58 | 17 | -5 | -1 | 4 |
| 5 | -1 | 4 | -11 | 52 | 26 | -8 | -1 | 4 |
| 6 | -1 | 3 | -9 | 47 | 31 | -10 | -1 | 3 |
| 7 | -1 | 4 | -11 | 45 | 34 | -10 | -1 | 4 |
| 8 | -1 | 4 | -11 | 40 | 40 | -11 | -1 | 4 |
| 9 | -1 | 4 | -10 | 34 | 45 | -11 | -1 | 4 |
| 10 | -1 | 4 | -10 | 31 | 47 | -9 | -1 | 4 |
| 11 | -1 | 3 | -8 | 26 | 52 | -11 | -1 | 3 |
| 12 | 0 | 1 | -5 | 17 | 58 | -10 | 0 | 1 |
| 13 | 0 | 1 | -4 | 13 | 60 | -8 | 0 | 1 |
| 14 | 0 | 1 | -3 | 8 | 62 | -5 | 0 | 1 |
| 15 | 0 | 1 | -2 | 4 | 63 | -3 | 0 | 1 |

FIG. 14

Table 7: 4-tap filters

| Fractional sample position p | 4-tap interpolation filter coefficients for chroma in VVC | | | |
|---|---|---|---|---|
| | p0 | p1 | p2 | p3 |
| 0 | 0 | 64 | 0 | 0 |
| 1 | -1 | 63 | 2 | 0 |
| 2 | -2 | 62 | 4 | 0 |
| 3 | -2 | 60 | 7 | -1 |
| 4 | -2 | 58 | 10 | -2 |
| 5 | -3 | 57 | 12 | -2 |
| 6 | -4 | 56 | 14 | -2 |
| 7 | -4 | 55 | 15 | -2 |
| 8 | -4 | 54 | 16 | -2 |
| 9 | -5 | 53 | 18 | -2 |
| 10 | -6 | 52 | 20 | -2 |
| 11 | -6 | 49 | 24 | -3 |
| 12 | -6 | 46 | 28 | -4 |
| 13 | -5 | 44 | 29 | -4 |
| 14 | -4 | 42 | 30 | -4 |
| 15 | -4 | 39 | 33 | -4 |
| 16 | -4 | 36 | 36 | -4 |
| 17 | -4 | 33 | 39 | -4 |
| 18 | -4 | 30 | 42 | -4 |
| 19 | -4 | 29 | 44 | -5 |
| 20 | -4 | 28 | 46 | -6 |
| 21 | -3 | 24 | 49 | -6 |
| 22 | -2 | 20 | 52 | -6 |
| 23 | -2 | 18 | 53 | -5 |
| 24 | -2 | 16 | 54 | -4 |
| 25 | -2 | 15 | 55 | -4 |
| 26 | -2 | 14 | 56 | -4 |
| 27 | -2 | 12 | 57 | -3 |
| 28 | -2 | 10 | 58 | -2 |
| 29 | -1 | 7 | 60 | -2 |
| 30 | 0 | 4 | 62 | -2 |
| 31 | 0 | 2 | 63 | -1 |

FIG. 15

Table 8: Interpolation Filter coefficients for 2:1 down-sampling

| Fractional sample position p | Interpolation filter coefficients for 2:1 downsampling | | | | | | | | | | | |
|---|---|---|---|---|---|---|---|---|---|---|---|---|
| | p0 | p1 | p2 | p3 | p4 | p5 | p6 | p7 | p8 | p9 | p10 | p11 |
| 0 | 2 | -3 | -9 | 6 | 39 | 58 | 39 | 6 | -9 | -3 | 2 | 0 |
| 1 | 2 | -3 | -9 | 4 | 38 | 58 | 43 | 7 | -9 | -4 | 1 | 0 |
| 2 | 2 | -2 | -9 | 2 | 35 | 58 | 44 | 9 | -8 | -4 | 1 | 0 |
| 3 | 1 | -2 | -9 | 1 | 34 | 58 | 46 | 11 | -8 | -5 | 1 | 0 |
| 4 | 1 | -1 | -8 | -1 | 31 | 57 | 47 | 13 | -7 | -5 | 1 | 0 |
| 5 | 1 | -1 | -8 | -2 | 29 | 56 | 49 | 15 | -7 | -6 | 1 | 1 |
| 6 | 1 | 0 | -8 | -3 | 26 | 55 | 51 | 17 | -7 | -6 | 1 | 1 |
| 7 | 1 | 0 | -7 | -4 | 24 | 54 | 52 | 19 | -6 | -7 | 1 | 1 |
| 8 | 1 | 0 | -7 | -5 | 22 | 53 | 53 | 22 | -5 | -7 | 0 | 1 |
| 9 | 1 | 1 | -7 | -6 | 19 | 52 | 54 | 24 | -4 | -7 | 0 | 1 |
| 10 | 1 | 1 | -6 | -7 | 17 | 51 | 55 | 26 | -3 | -8 | 0 | 1 |
| 11 | 1 | 1 | -6 | -7 | 15 | 49 | 56 | 29 | -2 | -8 | -1 | 1 |
| 12 | 0 | 1 | -5 | -7 | 13 | 47 | 57 | 31 | -1 | -8 | -1 | 1 |
| 13 | 0 | 1 | -5 | -8 | 11 | 46 | 58 | 34 | 1 | -9 | -2 | 1 |
| 14 | 0 | 1 | -4 | -8 | 9 | 44 | 58 | 35 | 2 | -9 | -2 | 2 |
| 15 | 0 | 1 | -4 | -9 | 7 | 43 | 58 | 38 | 4 | -9 | -3 | 2 |

FIG. 17

Table 9: Interpolation Filter coefficients for 1.5:1 down-sampling

| Fractional sample position p | Interpolation filter coefficients for 1.5 : 1 downsampling ||||||||||||
|---|---|---|---|---|---|---|---|---|---|---|---|---|
| | p0 | p1 | p2 | p3 | p4 | p5 | p6 | p7 | p8 | p9 | p10 | p11 |
| 0 | 0 | 5 | -6 | -10 | 37 | 76 | 37 | -10 | -6 | 5 | 0 | 0 |
| 1 | 0 | 5 | -4 | -11 | 33 | 76 | 40 | -9 | -7 | 5 | 0 | 0 |
| 2 | -1 | 5 | -3 | -12 | 29 | 75 | 45 | -7 | -8 | 5 | 0 | 0 |
| 3 | -1 | 4 | -2 | -13 | 25 | 75 | 48 | -5 | -9 | 5 | 1 | 0 |
| 4 | -1 | 4 | -1 | -13 | 22 | 73 | 52 | -3 | -10 | 4 | 1 | 0 |
| 5 | -1 | 4 | 0 | -13 | 18 | 72 | 55 | -1 | -11 | 4 | 2 | -1 |
| 6 | -1 | 4 | 1 | -13 | 14 | 70 | 59 | 2 | -12 | 3 | 2 | -1 |
| 7 | -1 | 3 | 1 | -13 | 11 | 68 | 62 | 5 | -12 | 3 | 2 | -1 |
| 8 | -1 | 3 | 2 | -13 | 8 | 65 | 65 | 8 | -13 | 2 | 3 | -1 |
| 9 | -1 | 2 | 3 | -12 | 5 | 62 | 68 | 11 | -13 | 1 | 3 | -1 |
| 10 | -1 | 2 | 3 | -12 | 2 | 59 | 70 | 14 | -13 | 1 | 4 | -1 |
| 11 | -1 | 2 | 4 | -11 | -1 | 55 | 72 | 18 | -13 | 0 | 4 | -1 |
| 12 | 0 | 1 | 4 | -10 | -3 | 52 | 73 | 22 | -13 | -1 | 4 | -1 |
| 13 | 0 | 1 | 5 | -9 | -5 | 48 | 75 | 25 | -13 | -2 | 4 | -1 |
| 14 | 0 | 0 | 5 | -8 | -7 | 45 | 75 | 29 | -12 | -3 | 5 | -1 |
| 15 | 0 | 0 | 5 | -7 | -9 | 40 | 76 | 33 | -11 | -4 | 5 | 0 |

FIG. 18

Table 10: Exemplary luma sample interpolation filtering process for reference down-sampling

---

The predicted luma sample value predSampleLX$_L$ is derived as follows:

- The sample array temp[ n ] with n = 0......15, is derived as follows:

temp[ n ] = ( $\sum_{i=0}^{7}$ f$_L$[ xFrac$_L$ ][ i ] * refPicLX$_L$[ xInt$_i$ ][ yInt$_n$ ] ) >> shift1

- The predicted luma sample value predSampleLX$_L$ is derived as follows:

predSampleLX$_L$ = ( $\sum_{i=0}^{7}$ f$_L$[ yFrac$_L$ ][ i ] * temp[ i ] ) >> shift2

FIG. 19

Table 11: Exemplary chroma sample interpolation filtering process for reference down-sampling

---

The predicted chroma sample value $predSampleLX_C$ is derived as follows:

- The sample array $temp[\,n\,]$ with $n = 0\ldots\ldots 15$, is derived as follows:

$temp[\,n\,] = (\sum_{i=0}^{3} f_C[\,xFrac_C\,][\,i\,] * refPicLX_C[\,xInt_i\,][\,yInt_n\,]) \gg shift1$

- The predicted chroma sample value $predSampleLX_C$ is derived as follows:

$predSampleLX_C = (\sum_{i=0}^{7} f_C[\,yFrac_C\,][\,i\,] * temp[\,i\,]) \gg shift2$

Table 12: Exemplary luma sample interpolation filtering process for reference down-sampling

- The sample array temp[ n ] with n = 0......15, is derived as follows:

temp[ n ] = ( $\sum_{i=0}^{7}$ f$_L$[ xFrac$_L$ ][ i ] * refPicLX$_L$[ xInt$_i$ ][ yInt$_n$ ] ) >> ( shift1 + 1 )

- The predicted luma sample value predSampleLX$_L$ is derived as follows:

predSampleLX$_L$ = ( $\sum_{i=0}^{7}$ f$_L$[ yFrac$_L$ ][ i ] * temp[ i ] ) >> ( shift2 + 1 )

FIG. 21

Table 13: Exemplary chroma sample interpolation filtering process for reference down-sampling

- The sample array temp[ n ] with n = 0......15, is derived as follows:

temp[ n ] = ( $\sum_{i=0}^{3}$ fc[ xFrac$_C$ ][ i ] * refPicLX$_C$[ xInt$_i$ ][ yInt$_n$ ] ) >> ( shift1 + 1 )

- The predicted chroma sample value predSampleLX$_C$ is derived as follows:

predSampleLX$_C$ = ( $\sum_{i=0}^{7}$ fc[ yFrac$_C$ ][ i ] * temp[ i ] ) >> ( shift2 + 1 )

FIG. 22

Table 14: Exemplary luma sample interpolation filtering process for reference down-sampling

---

- The sample array temp[ n ] with n = 0 ..... 15, is derived as follows:

temp[ n ] = ( $\sum_{i=0}^{7}$ f$_L$[ xFrac$_L$ ][ i ] * refPicLX$_L$[ xInt$_i$ ][ yInt$_n$ ] ) >> shift1

- The predicted luma sample value predSampleLX$_L$ is derived as follows:

predSampleLX$_L$ = ( $\sum_{i=0}^{7}$ f$_L$[ yFrac$_L$ ][ i ] * temp[ i ] ) >> ( shift2 + 2 )

Table 15: Exemplary chroma sample interpolation filtering process for reference down-sampling

- The sample array temp[ n ] with n = 0......15, is derived as follows:

temp[ n ] = ( $\sum_{i=0}^{3}$ fc[ xFrac$_C$ ][ i ] * refPicLX$_C$[ xInt$_i$ ][ yInt$_n$ ] ) >> shift1

- The predicted chroma sample value predSampleLX$_C$ is derived as follows:

predSampleLX$_C$ = ( $\sum_{i=0}^{7}$ fc[ yFrac$_C$ ][ i ] * temp[ i ] ) >> ( shift2 + 2 )

FIG. 24

Table 16: Exemplary chroma fractional sample position calculation for reference down-sampling

- The variables $xInt_C$, $yInt_C$, $xFrac_C$ and $yFrac_C$ are derived as follows:

$xInt_C = refx_C >> 5$ $yInt_C = refy_C >> 5$ $xFrac_C = ( refy_C \ \& \ 31 ) >> 1$ $yFrac_C = ( refy_C \ \& \ 31 ) >> 1$

FIG. 25

Table 17: 8-tap filter for MC interpolation with reference downsampling at ratio 2:1

| Fractional sample position p | 8-tap filter for MC interpolation with reference downsampling at ratio 2:1 | | | | | | | |
|---|---|---|---|---|---|---|---|---|
| | p0 | p1 | p2 | p3 | p4 | p5 | p6 | p7 |
| 0 | -2 | 2 | 18 | 28 | 18 | 2 | -2 | 0 |
| 1 | -2 | 1 | 17 | 28 | 19 | 3 | -2 | 0 |
| 2 | -2 | 1 | 16 | 28 | 20 | 4 | -3 | 0 |
| 3 | -2 | 0 | 15 | 28 | 21 | 4 | -2 | 0 |
| 4 | -2 | 0 | 14 | 27 | 22 | 5 | -2 | 0 |
| 5 | -2 | -1 | 13 | 27 | 23 | 6 | -2 | 0 |
| 6 | -1 | -1 | 12 | 26 | 24 | 7 | -2 | -1 |
| 7 | -1 | -1 | 10 | 26 | 25 | 8 | -2 | -1 |
| 8 | -1 | -2 | 10 | 25 | 25 | 10 | -2 | -1 |
| 9 | -1 | -2 | 8 | 25 | 26 | 10 | -1 | -1 |
| 10 | -1 | -2 | 7 | 24 | 27 | 12 | -1 | -2 |
| 11 | 0 | -2 | 6 | 23 | 27 | 13 | -1 | -2 |
| 12 | -1 | -2 | 5 | 22 | 28 | 14 | 0 | -2 |
| 13 | 0 | -2 | 4 | 21 | 28 | 15 | 0 | -2 |
| 14 | 0 | -3 | 4 | 20 | 28 | 16 | 1 | -2 |
| 15 | 0 | -2 | 3 | 19 | 28 | 17 | 1 | -2 |

FIG. 26

Table 18: 8-tap filter for MC interpolation with reference downsampling at ratio 1.5:1

| Fractional sample position p | 8-tap filter for MC interpolation with reference downsampling at ratio 1.5:1 | | | | | | | |
|---|---|---|---|---|---|---|---|---|
| | p0 | p1 | p2 | p3 | p4 | p5 | p6 | p7 |
| 0 | -2 | -4 | 18 | 40 | 18 | -4 | -2 | 0 |
| 1 | -1 | -5 | 16 | 39 | 21 | -4 | -2 | 0 |
| 2 | -1 | -5 | 14 | 39 | 22 | -3 | -2 | 0 |
| 3 | 0 | -5 | 12 | 38 | 24 | -2 | -3 | 0 |
| 4 | 0 | -5 | 10 | 38 | 26 | -2 | -3 | 0 |
| 5 | 0 | -5 | 8 | 37 | 28 | 0 | -4 | 0 |
| 6 | 0 | -5 | 7 | 35 | 30 | 1 | -4 | 0 |
| 7 | 0 | -5 | 5 | 34 | 32 | 2 | -4 | 0 |
| 8 | 0 | -5 | 4 | 33 | 33 | 4 | -5 | 0 |
| 9 | 0 | -4 | 2 | 32 | 34 | 5 | -5 | 0 |
| 10 | 0 | -4 | 1 | 30 | 35 | 7 | -5 | 0 |
| 11 | 0 | -4 | 0 | 28 | 37 | 8 | -5 | 0 |
| 12 | 0 | -3 | -2 | 26 | 38 | 10 | -5 | 0 |
| 13 | 0 | -3 | -2 | 24 | 38 | 12 | -5 | 0 |
| 14 | 0 | -2 | -3 | 22 | 39 | 14 | -5 | -1 |
| 15 | 0 | -2 | -4 | 21 | 39 | 16 | -5 | -1 |

FIG. 27

Table 19: 8-tap filter for MC interpolation with reference downsampling at ratio 2:1

| Fractional sample position p | 8-tap filter for MC interpolation with reference downsampling at ratio 2:1 | | | | | | | |
|---|---|---|---|---|---|---|---|---|
| | p0 | p1 | p2 | p3 | p4 | p5 | p6 | p7 |
| 0 | -2 | 2 | 18 | 28 | 18 | 2 | -2 | 0 |
| 1 | -2 | 2 | 17 | 28 | 19 | 2 | -2 | 0 |
| 2 | -2 | 1 | 17 | 28 | 19 | 3 | -2 | 0 |
| 3 | -2 | 1 | 16 | 28 | 20 | 3 | -2 | 0 |
| 4 | -2 | 1 | 16 | 28 | 20 | 4 | -3 | 0 |
| 5 | -2 | 0 | 15 | 28 | 21 | 4 | -2 | 0 |
| 6 | -2 | 0 | 15 | 28 | 21 | 4 | -2 | 0 |
| 7 | -2 | 0 | 14 | 27 | 22 | 5 | -2 | 0 |
| 8 | -2 | 0 | 14 | 27 | 22 | 5 | -2 | 0 |
| 9 | -2 | 0 | 13 | 27 | 23 | 6 | -2 | -1 |
| 10 | -2 | -1 | 13 | 27 | 23 | 6 | -2 | 0 |
| 11 | -1 | -1 | 12 | 27 | 23 | 7 | -2 | -1 |
| 12 | -1 | -1 | 12 | 26 | 24 | 7 | -2 | -1 |
| 13 | -1 | -1 | 11 | 26 | 24 | 8 | -2 | -1 |
| 14 | -1 | -1 | 10 | 26 | 25 | 8 | -2 | -1 |
| 15 | -1 | -2 | 10 | 26 | 25 | 9 | -2 | -1 |
| 16 | -1 | -2 | 10 | 25 | 25 | 10 | -2 | -1 |
| 17 | -1 | -2 | 9 | 25 | 26 | 10 | -2 | -1 |
| 18 | -1 | -2 | 8 | 25 | 26 | 10 | -1 | -1 |
| 19 | -1 | -2 | 8 | 24 | 26 | 11 | -1 | -1 |
| 20 | -1 | -2 | 7 | 24 | 27 | 12 | -1 | -2 |
| 21 | -1 | -2 | 7 | 24 | 27 | 12 | -1 | -2 |
| 22 | 0 | -2 | 6 | 23 | 27 | 13 | -1 | -2 |
| 23 | -1 | -2 | 6 | 23 | 27 | 13 | 0 | -2 |
| 24 | -1 | -2 | 5 | 22 | 28 | 14 | 0 | -2 |
| 25 | -1 | -2 | 5 | 22 | 28 | 14 | 0 | -2 |
| 26 | 0 | -2 | 4 | 21 | 28 | 15 | 0 | -2 |
| 27 | 0 | -2 | 4 | 21 | 28 | 15 | 0 | -2 |
| 28 | 0 | -3 | 4 | 20 | 28 | 16 | 1 | -2 |
| 29 | 0 | -3 | 3 | 20 | 28 | 17 | 1 | -2 |
| 30 | 0 | -2 | 3 | 19 | 28 | 17 | 1 | -2 |
| 31 | 0 | -3 | 2 | 19 | 28 | 18 | 2 | -2 |

FIG. 28

Table 20: 8-tap filter for MC interpolation with reference downsampling at ratio 1.5:1

| Fractional sample position p | 8-tap filter for MC interpolation with reference downsampling at ratio 1.5:1 | | | | | | | |
|---|---|---|---|---|---|---|---|---|
| | p0 | p1 | p2 | p3 | p4 | p5 | p6 | p7 |
| 0 | -2 | -4 | 18 | 40 | 18 | -4 | -2 | 0 |
| 1 | -1 | -4 | 17 | 39 | 19 | -4 | -2 | 0 |
| 2 | -1 | -5 | 16 | 39 | 21 | -4 | -2 | 0 |
| 3 | -1 | -5 | 15 | 39 | 21 | -3 | -2 | 0 |
| 4 | -1 | -5 | 14 | 39 | 22 | -3 | -2 | 0 |
| 5 | -1 | -5 | 13 | 39 | 23 | -3 | -2 | 0 |
| 6 | 0 | -5 | 12 | 38 | 24 | -2 | -3 | 0 |
| 7 | 0 | -5 | 11 | 38 | 25 | -2 | -3 | 0 |
| 8 | 0 | -5 | 10 | 38 | 26 | -2 | -3 | 0 |
| 9 | 0 | -5 | 9 | 37 | 27 | -1 | -3 | 0 |
| 10 | 0 | -5 | 8 | 37 | 28 | 0 | -4 | 0 |
| 11 | 0 | -5 | 8 | 36 | 29 | 0 | -4 | 0 |
| 12 | 0 | -5 | 7 | 35 | 30 | 1 | -4 | 0 |
| 13 | 0 | -5 | 6 | 35 | 31 | 1 | -4 | 0 |
| 14 | 0 | -5 | 5 | 34 | 32 | 2 | -4 | 0 |
| 15 | 0 | -5 | 4 | 34 | 32 | 3 | -4 | 0 |
| 16 | 0 | -5 | 4 | 33 | 33 | 4 | -5 | 0 |
| 17 | 0 | -4 | 3 | 32 | 34 | 4 | -5 | 0 |
| 18 | 0 | -4 | 2 | 32 | 34 | 5 | -5 | 0 |
| 19 | 0 | -4 | 1 | 31 | 35 | 6 | -5 | 0 |
| 20 | 0 | -4 | 1 | 30 | 35 | 7 | -5 | 0 |
| 21 | 0 | -4 | 0 | 29 | 36 | 8 | -5 | 0 |
| 22 | 0 | -4 | 0 | 28 | 37 | 8 | -5 | 0 |
| 23 | 0 | -3 | -1 | 27 | 37 | 9 | -5 | 0 |
| 24 | 0 | -3 | -2 | 26 | 38 | 10 | -5 | 0 |
| 25 | 0 | -3 | -2 | 25 | 38 | 11 | -5 | 0 |
| 26 | 0 | -3 | -2 | 24 | 38 | 12 | -5 | 0 |
| 27 | 0 | -2 | -3 | 23 | 39 | 13 | -5 | -1 |
| 28 | 0 | -2 | -3 | 22 | 39 | 14 | -5 | -1 |
| 29 | 0 | -2 | -3 | 21 | 39 | 15 | -5 | -1 |
| 30 | 0 | -2 | -4 | 21 | 39 | 16 | -5 | -1 |
| 31 | 0 | -2 | -4 | 19 | 39 | 17 | -4 | -1 |

FIG. 29

Table 21: 6-tap filter coefficients for luma 4x4 block MC interpolation with reference downsampling with ratio 2:1

| Fractional sample position p | 6-tap filter coefficients for luma 4x4 block MC interpolation with reference downsampling with ratio 2:1 | | | | | |
|---|---|---|---|---|---|---|
| | p0 | p1 | p2 | p3 | p4 | p5 |
| 0 | 1 | 17 | 28 | 17 | 1 | 0 |
| 1 | 1 | 16 | 27 | 18 | 2 | 0 |
| 2 | 1 | 14 | 27 | 19 | 3 | 0 |
| 3 | 0 | 13 | 27 | 20 | 4 | 0 |
| 4 | 0 | 12 | 27 | 21 | 4 | 0 |
| 5 | 0 | 11 | 26 | 22 | 5 | 0 |
| 6 | 0 | 10 | 26 | 23 | 6 | -1 |
| 7 | 0 | 9 | 25 | 24 | 7 | -1 |
| 8 | -1 | 8 | 25 | 25 | 8 | -1 |
| 9 | -1 | 7 | 24 | 25 | 9 | 0 |
| 10 | -1 | 6 | 23 | 26 | 10 | 0 |
| 11 | 0 | 5 | 22 | 26 | 11 | 0 |
| 12 | 0 | 4 | 21 | 27 | 12 | 0 |
| 13 | 0 | 4 | 20 | 27 | 13 | 0 |
| 14 | 0 | 3 | 19 | 27 | 14 | 1 |
| 15 | 0 | 2 | 18 | 27 | 16 | 1 |

FIG. 30

Table 22: 6-tap filter coefficients for luma 4x4 block MC interpolation with reference downsampling with ratio 1.5:1

| Fractional sample position p | 6-tap filter coefficients for luma 4x4 block MC interpolation with reference downsampling with ratio 1.5:1 | | | | | |
|---|---|---|---|---|---|---|
| | p0 | p1 | p2 | p3 | p4 | p5 |
| 0 | -3 | 16 | 38 | 16 | -3 | 0 |
| 1 | -3 | 14 | 37 | 18 | -2 | 0 |
| 2 | -3 | 12 | 37 | 20 | -2 | 0 |
| 3 | -3 | 11 | 36 | 22 | -2 | 0 |
| 4 | -3 | 9 | 36 | 24 | -1 | -1 |
| 5 | -3 | 7 | 35 | 26 | 0 | -1 |
| 6 | -3 | 6 | 34 | 28 | 1 | -2 |
| 7 | -3 | 4 | 33 | 30 | 2 | -2 |
| 8 | -2 | 3 | 31 | 31 | 3 | -2 |
| 9 | -2 | 2 | 30 | 33 | 4 | -3 |
| 10 | -2 | 1 | 28 | 34 | 6 | -3 |
| 11 | -1 | 0 | 26 | 35 | 7 | -3 |
| 12 | -1 | -1 | 24 | 36 | 9 | -3 |
| 13 | -1 | -2 | 23 | 37 | 11 | -4 |
| 14 | -1 | -3 | 21 | 38 | 13 | -4 |
| 15 | -1 | -3 | 19 | 38 | 15 | -4 |

FIG. 31

ADAPTIVE RESOLUTION CHANGE IN VIDEO PROCESSING

CROSS-REFERENCE TO RELATED APPLICATIONS

The present disclosure claims the benefits of priority to U.S. Provisional Patent Application No. 62/865,927, filed on Jun. 24, 2019, and U.S. Provisional Patent Application No. 62/900,439, filed on Sep. 13, 2019, both of which are incorporated herein by reference in their entireties.

TECHNICAL FIELD

The present disclosure generally relates to video processing, and more particularly, to methods and systems for performing adaptive resolution change in video coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide a method for performing adaptive resolution change during video encoding or decoding. In one exemplary embodiment, the method includes: comparing resolutions of a target picture and a first reference picture; in response to the target picture and the first reference picture having different resolutions, resampling the first reference picture to generate a second reference picture; and encoding or decoding the target picture using the second reference picture.

The embodiments of the present disclosure also provide a device for performing adaptive resolution change during video encoding or decoding. In one exemplary embodiment, the device includes: one or more memories storing computer instructions; and one or more processors configured to execute the computer instructions to cause the device to: compare resolutions of a target picture and a first reference picture; in response to the target picture and the first reference picture having different resolutions, resample the first reference picture to generate a second reference picture; and encode or decode the target picture using the second reference picture.

The embodiments of the present disclosure also provide a non-transitory computer readable medium storing a set of instructions that is executable by at least one processor of a computer system to cause the computer system to perform a method for adaptive resolution change. In one exemplary embodiment, the method includes: comparing resolutions of a target picture and a first reference picture; in response to the target picture and the first reference picture having different resolutions, resampling the first reference picture to generate a second reference picture; and encoding or decoding the target picture using the second reference picture.

BRIEF DESCRIPTION OF THE DRAWINGS

Embodiments and various aspects of the present disclosure are illustrated in the following detailed description and the accompanying figures. Various features shown in the figures are not drawn to scale.

FIG. 4 is a table showing sub-pel motion compensation interpolation filter used for luma component in Versatile Video Coding (VVC), consistent with embodiments of the disclosure.

FIG. 5 is a table showing sub-pel motion compensation interpolation filter used for chroma component in VVC, consistent with embodiments of the disclosure.

FIG. 7 is a table showing an example of a supported resolution set including three different resolutions, consistent with embodiments of the disclosure.

FIG. 11 is a table showing an exemplary down-sampling filter, consistent with embodiments of the disclosure.

FIG. 13 illustrates frequency response of an exemplary low pass filter, consistent with embodiments of the disclosure.

FIG. 14 is a table showing 6-tap filters, consistent with embodiments of the disclosure.

FIG. 15 is a table showing 8-tap filters, consistent with embodiments of the disclosure.

FIG. 17 is a table showing Interpolation Filter coefficients for 2:1 down-sampling, consistent with embodiments of the disclosure.

FIG. 18 is a table showing Interpolation Filter coefficients for 1.5:1 down-sampling, consistent with embodiments of the disclosure.

FIG. 19 shows an exemplary luma sample interpolation filtering process for reference down-sampling, consistent with embodiments of the disclosure.

FIG. 20 shows an exemplary chroma sample interpolation filtering process for reference down-sampling, consistent with embodiments of the disclosure.

FIG. 21 shows an exemplary luma sample interpolation filtering process for reference down-sampling, consistent with embodiments of the disclosure.

FIG. 22 shows an exemplary chroma sample interpolation filtering process for reference down-sampling, consistent with embodiments of the disclosure.

FIG. 23 shows an exemplary luma sample interpolation filtering process for reference down-sampling, consistent with embodiments of the disclosure.

FIG. 24 shows an exemplary chroma sample interpolation filtering process for reference down-sampling, consistent with embodiments of the disclosure.

FIG. 25 shows an exemplary chroma fractional sample position calculation for reference down-sampling, consistent with embodiments of the disclosure.

FIG. 26 is a table showing 8-tap filter for MC interpolation with reference downsampling at ratio 2:1, consistent with embodiments of the disclosure.

FIG. 27 is a table showing 8-tap filter for MC interpolation with reference downsampling at ratio 1.5:1, consistent with embodiments of the disclosure.

FIG. 28 is a table showing 8-tap filter for MC interpolation with reference downsampling at ratio 2:1, consistent with embodiments of the disclosure.

FIG. 29 is a table showing 8-tap filter for MC interpolation with reference downsampling at ratio 1.5:1, consistent with embodiments of the disclosure.

FIG. 30 is a table showing 6-tap filter coefficients for luma 4×4 block MC interpolation with reference downsampling with ratio 2:1, consistent with embodiments of the disclosure.

FIG. 31 is a table showing 6-tap filter coefficients for luma 4×4 block MC interpolation with reference downsampling with ratio 1.5:1, consistent with embodiments of the disclosure.

DETAILED DESCRIPTION

Figure 1:
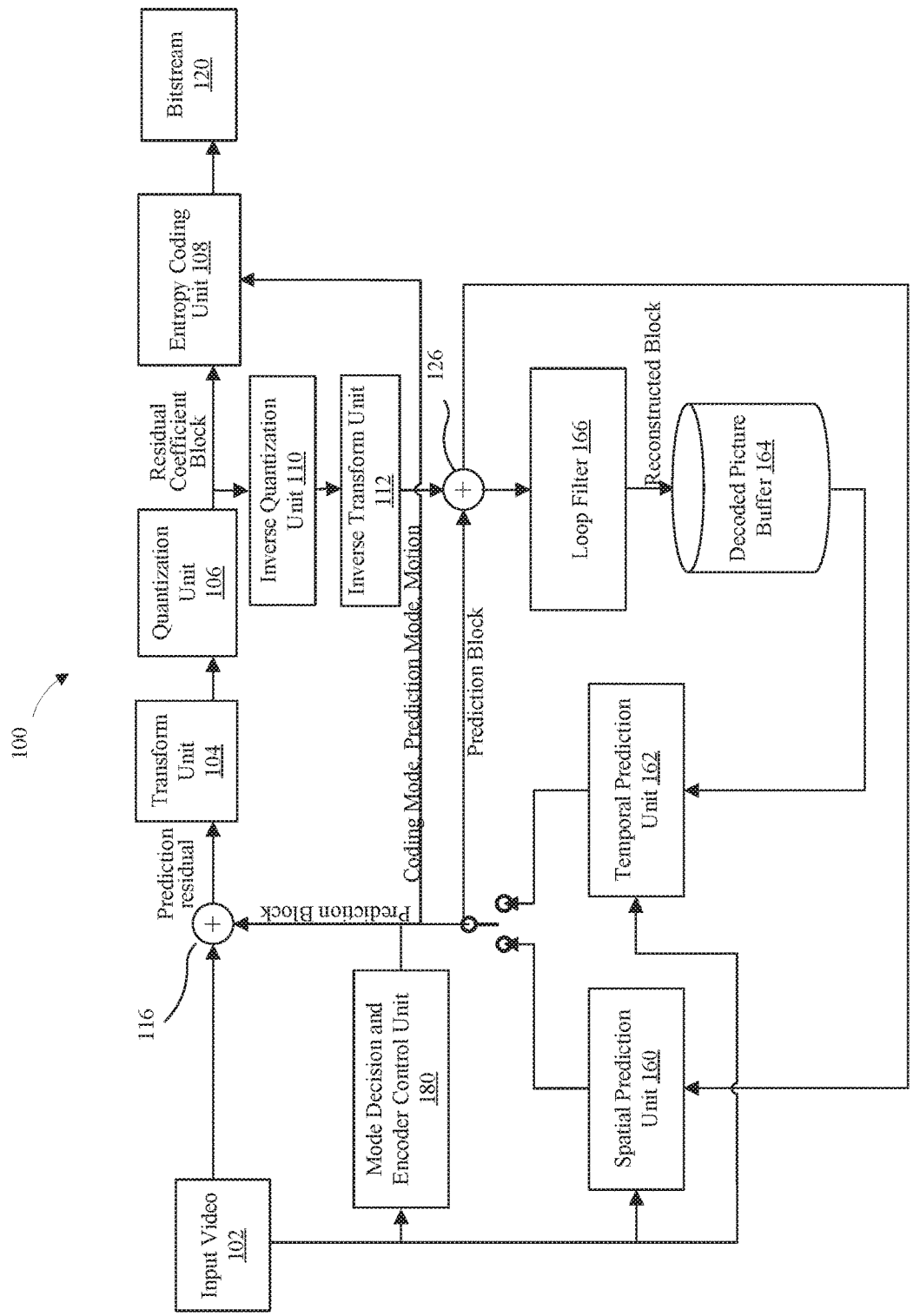
FIG. 1 is a schematic diagram illustrating an exemplary video encoder, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels, among which the position changes are mostly concerned. Position changes of a group of pixels that represent an object can reflect the motion of the object between the reference picture and the current picture.

In order to achieve the same subjective quality as HEVC/H.265 using half the bandwidth, the JVET has been developing technologies beyond HEVC using the joint exploration model ("JEM") reference software. As coding technologies were incorporated into the JEM, the JEM achieved substantially higher coding performance than HEVC. The VCEG and MPEG have also formally started the development of a next generation video compression standard beyond HEVC—the Versatile Video Coding (VVC/H.266) standard.

The VVC standard is continuing to include more coding technologies that provide better compression performance. VVC can be implemented in the same video coding system that has been used in modern video compression standards such as HEVC, H.264/AVC, MPEG2, H.263, etc. FIG. 1 is a schematic diagram illustrating an exemplary video encoder 100, consistent with the disclosed embodiments. For example, video encoder 100 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes and inter modes (such as uni-prediction or bi-prediction) may refer to a number of temporal-based compression modes.

Referring to FIG. 1, input video signal 102 may be processed block by block. For example, the video block unit may be a 16×16 pixel block (e.g., a macroblock (MB)). In HEVC, extended block sizes (e.g., a coding unit (CU)) may be used to compress video signals of resolution, e.g., 1080p and beyond. In HEVC, a CU may include up to 64×64 luma samples and corresponding chroma samples. In VVC, the size of a CU may be further increased to include 128×128 luma samples and corresponding chroma samples. A CU may be partitioned into prediction units (PUs), for which separate prediction methods may be applied. Each input video block (e.g., MB, CU, PU, etc.) may be processed by using spatial prediction unit 160 or temporal prediction unit 162.

Spatial prediction unit 160 performs spatial prediction (e.g., intra prediction) to the current CU using information on the same picture/slice containing the current CU. Spatial prediction may use pixels from the already coded neighboring blocks in the same video picture/slice to predict the current video block. Spatial prediction may reduce spatial redundancy inherent in the video signal. Temporal prediction (e.g., inter prediction or motion compensated prediction) may use samples from the already coded video pictures to predict the current video block. Temporal prediction may reduce temporal redundancy inherent in the video signal.

Temporal prediction unit 162 performs temporal prediction (e.g., inter prediction) to the current CU using information from picture(s)/slice(s) different from the picture/slice containing the current CU. Temporal prediction for a video block may be signaled by one or more motion vectors. The motion vectors may indicate the amount and the direction of motion between the current block and one or more of its prediction block(s) in the reference frames. If multiple reference pictures are supported, one or more reference picture indices may be sent for a video block. The one or more reference indices may be used to identify from which reference picture(s) in the decoded picture buffer (DPB) 164 (also called reference picture store 164), the temporal prediction signal may come. After spatial or temporal prediction, the mode decision and encoder control unit 180 in the encoder may choose the prediction mode, for example based on a rate-distortion optimization method. The prediction block may be subtracted from the current video block at adder 116. The prediction residual may be transformed by transformation unit 104 and quantized by quantization unit 106. The quantized residual coefficients may be inverse quantized at inverse quantization unit 110 and inverse transformed at inverse transform unit 112 to form the reconstructed residual. The reconstructed block may be added to the prediction block at adder 126 to form the reconstructed video block. The in-loop filtering, such as deblocking filter and adaptive loop filters 166, may be applied on the reconstructed video block before it is put in the reference picture store 164 and used to code future video blocks. To form the output video bitstream 120, coding mode (e.g., inter or intra), prediction mode information, motion information, and quantized residual coefficients may be sent to the entropy coding unit 108 to be compressed and packed to form the bitstream 120.

Consistent with the disclosed embodiments, the above-described units of video encoder 100 can be implemented as software modules (e.g., computer programs that fulfill different functions), hardware components (e.g., different circuitry blocks for performing the respective functions), or a hybrid of software and hardware.

Figure 2:
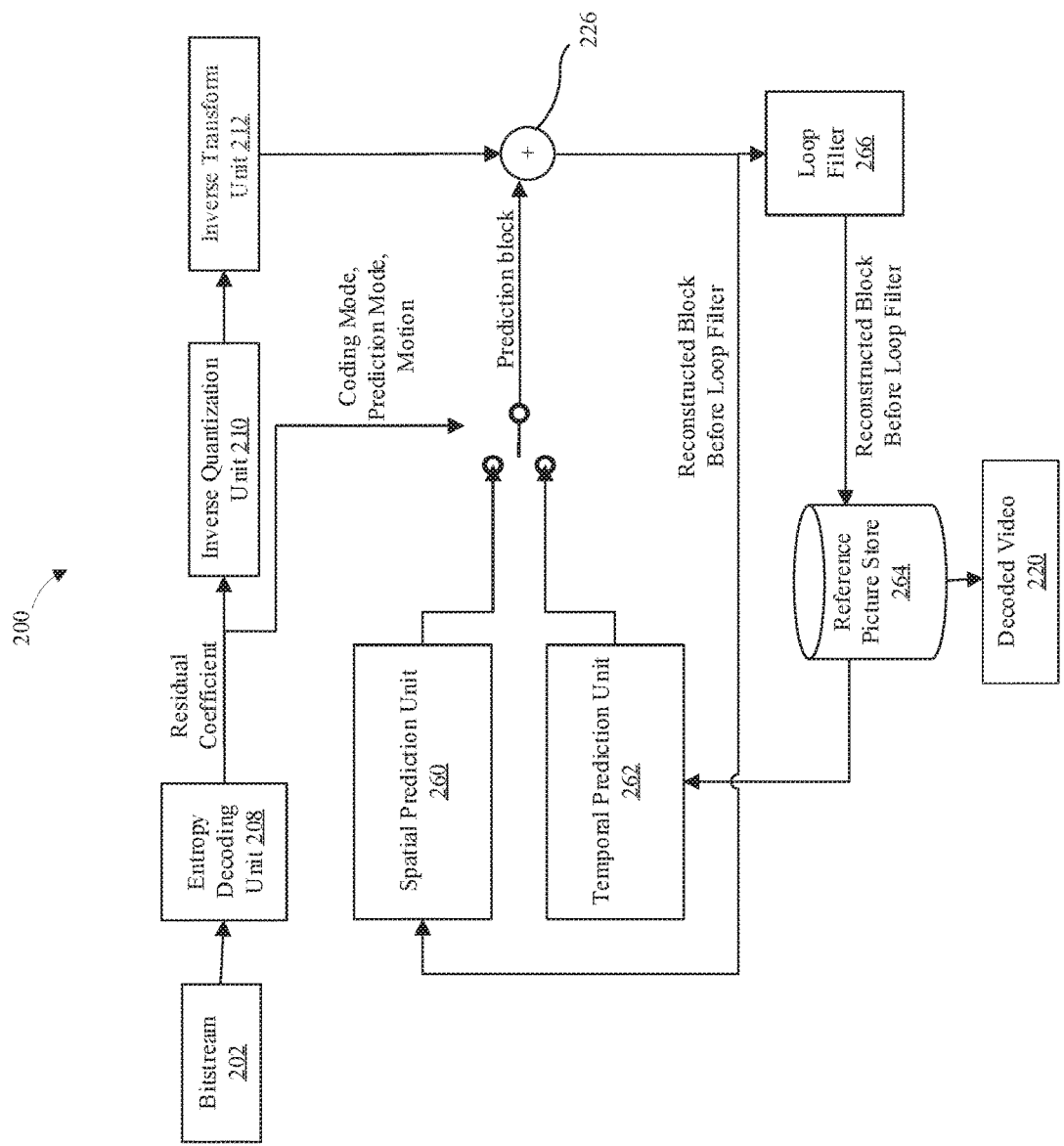
FIG. 2 is a schematic diagram illustrating an exemplary video decoder, consistent with embodiments of the disclosure.

FIG. 2 is a schematic diagram illustrating an exemplary video decoder 200, consistent with the disclosed embodiments. Referring to FIG. 2, a video bitstream 202 may be unpacked or entropy decoded at entropy decoding unit 208. The coding mode or prediction information may be sent to the spatial prediction unit 260 (e.g., if intra coded) or the temporal prediction unit 262 (e.g., if inter coded) to form the prediction block. If inter coded, the prediction information may comprise prediction block sizes, one or more motion vectors (e.g., which may indicate direction and amount of motion), or one or more reference indices (e.g., which may indicate from which reference picture the prediction signal is to be obtained).

Motion compensated prediction may be applied by the temporal prediction unit 262 to form the temporal prediction block. The residual transform coefficients may be sent to inverse quantization unit 210 and inverse transform unit 212 to reconstruct the residual block. The prediction block and the residual block may be added together at 226. The reconstructed block may go through in-loop filtering (via loop filer 266) before it is stored in decoded picture buffer (DPB) 264 (also called reference picture store 264). The reconstructed video in the DPB 264 may be used to drive a display device or used to predict future video blocks. Decoded video 220 may be displayed on a display.

Consistent with the disclosed embodiments, the above-described units of video decoder 200 can be implemented as software modules (e.g., computer programs that fulfill different functions), hardware components (e.g., different circuitry blocks for performing the respective functions), or a hybrid of software and hardware.

One of the objectives of the VVC standard is to offer video conferencing applications the ability to tolerate diversity of networks and devices. In particular, the VVC standard needs to provide the ability of rapidly adapting to varying network environments, including rapidly reducing encoded bitrate when network conditions deteriorate, and rapidly increasing video quality when network conditions improve. Additionally, for adaptive streaming services that offer multiple representations of the same content, each of the multiple representations may have different properties (e.g. spatial resolution or sample bit depth) and the video quality may vary from low to high. The VVC standard thus needs to support fast representation switching for the adaptive streaming services. During switching from one representation to another representation (such as switching from one resolution to another resolution), the VVC standard needs to enable the use of efficient prediction structure without compromising the fast and seamless switching capability.

In some embodiments consistent with the present disclosure, to change the resolution, the encoder (e.g., encoder 100 in FIG. 1) sends an instantaneous-decoder-refresh (IDR) coded picture to clear the contents of the reference picture buffer (e.g., the DPB 164 in FIG. 1 and DPB 264 in FIG. 2). On receiving an IDR coded picture, the decoder (e.g., decoder 200 in FIG. 2) marks all pictures in the reference buffer as "unused for reference." All subsequent transmitted pictures can be decoded without reference to any frame decoded prior to the IDR picture. The first picture in a coded video sequence is always an IDR picture.

Figure 3:
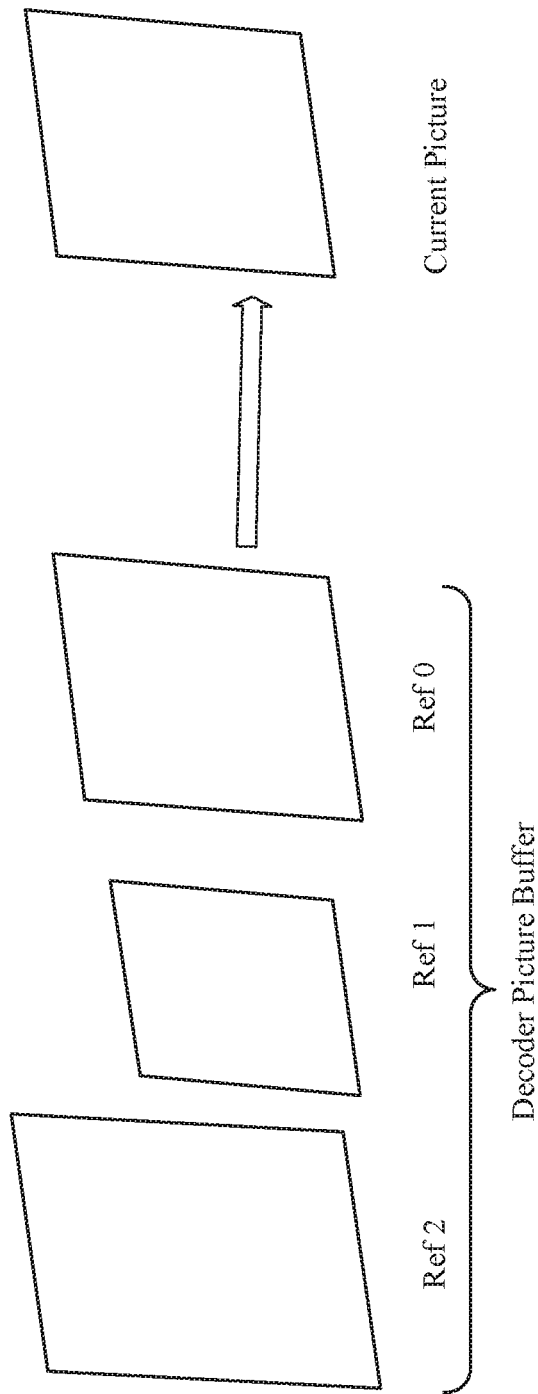
FIG. 3 illustrates an example in which resolution of reference pictures are different from a current picture, consistent with embodiments of the disclosure.

In some embodiments consistent with the present disclosure, adaptive resolution change (ARC) technology can be used to allow a video stream to change spatial resolution between coding pictures within the same video sequence, without requiring a new IDR picture and without requiring multi-layers as in scalable video codec. According to the ARC technology, at a resolution-switch point, a currently coded picture is either predicted from reference pictures with the same resolution (if available), or predicted from reference pictures of a different resolution by resampling the reference pictures. An illustration of adaptive resolution change is shown in FIG. 3, where the resolution of reference picture "Ref 0" is the same as the resolution of the currently coded picture. However, resolutions of reference pictures "Ref 1" and "Ref 2" are different from the resolution of the current picture. To generate motion compensated prediction signal of the current picture, both "Ref 1" and "Ref 2" are resampled to the resolution of the current picture.

Consistent with the present disclosure, when the resolution of reference frame is different from that of the current frame, one way to generate the motion compensated prediction signal is picture-based resampling, where the reference picture is first resampled to the same resolution as the current picture, and the existing motion compensation process with motion vectors can be applied. The motion vectors may be scaled (if they are sent in units before resampling is applied) or not scaled (if they are sent in units after resampling is applied). With the picture-based resampling, in particular for reference picture down-sampling (that is, resolution of the reference picture is larger than that of the current picture), information may be lost in the reference resampling step before the motion compensated interpolation, because down-sampling is usually achieved with a low-pass filtering followed by decimation).

Another way is block-based resampling, where resampling is performed at the block level. This is done by examining the reference picture(s) used by the current block, and if one or both of them have different resolutions than the current picture, then resampling is performed in combination with the sub-pel motion compensated interpolation process.

The present disclosure provides both picture-based resampling methods and block-based resampling methods for use with ARC. The following description first addresses the disclosed picture-based resampling methods, and then addresses the disclosed block-based resampling methods.

The disclosed picture-based resampling methods can solve some problems caused by traditional block-based resampling methods. First, in traditional block-level resampling method, on-the-fly block level resampling can be performed when it is determined that the resolution of a reference picture is different from the resolution of current picture. The block level resampling process, however, could complicate the encoder design because the encoder may have to resample the block at each search point during motion search. Motion search is generally a time-consuming process for an encoder, and thus the on-the-fly requirement during motion search may complicate the motion search process. As an alternative to the on-the-fly block level resampling, the encoder may resample the reference picture in advance such that the resampled reference picture has the same resolution as that of the current picture. However, this may degrade coding efficiency because it may cause the prediction signals during motion estimation and motion compensation to be different.

Second, in the traditional block-based resampling method, the design of block level resampling is not compatible with some other useful coding tools, such as sub-block-based temporal motion vector prediction (SbTMVP), affine motion compensated prediction, decoder side motion vector refinement (DMVR), etc. These coding tools may be disabled when ARC is enabled. But such disabling decreases the coding performance significantly.

Third, although any sub-pel motion compensated interpolation filter known in the art may be used for block resampling, it may not be equally applicable to block up-sampling and block down-sampling. For example, interpolation filter used for motion compensation may be used for the up-sampling in cases where reference picture has lower resolution than the current picture. However, the interpolation filter is not suitable for the down-sampling in cases where reference picture has higher resolution than the current picture, because the interpolation filter cannot filter the integer positions and thus may produce aliasing. For example, Table 1 (FIG. 4) shows exemplary interpolation filter coefficients used for luma component integer positions with various values of the fractional sample positions. Table 2 (FIG. 5) shows exemplary interpolation filter coefficients used for chroma components with various values of the fractional sample positions. As it is shown in the Table 1 (FIG. 4) and Table 2 (FIG. 5), at fractional sample position 0 (i.e. integer position), no interpolation filter is applied.

To avoid the above-described problems associated with the traditional block-based resampling method, the present disclosure provides picture-level resampling methods that can be used for ARC. The picture resampling process can involve either up-sampling or down-sampling. Up sampling is the increasing of the spatial resolution while keeping the two-dimensional (2D) representation of an image. In the up-sampling process, the resolution of the reference picture is increased by interpolating the unavailable samples from the neighboring available samples. In the down-sampling process, the resolution of the reference image is reduced.

According to the disclosed embodiments, resampling can be performed at the picture level. In picture level resampling, if the resolution of a reference picture is different from the resolution of the current picture, the reference picture is resampled to the resolution of the current picture. The motion estimation and/or compensation of the current picture can be performed based on the resampled reference picture. This way, the ARC can be implemented in a "transparent" manner at the encoder and the decoder, because the block-level operations are agnostic to the resolution change.

Figure 6:
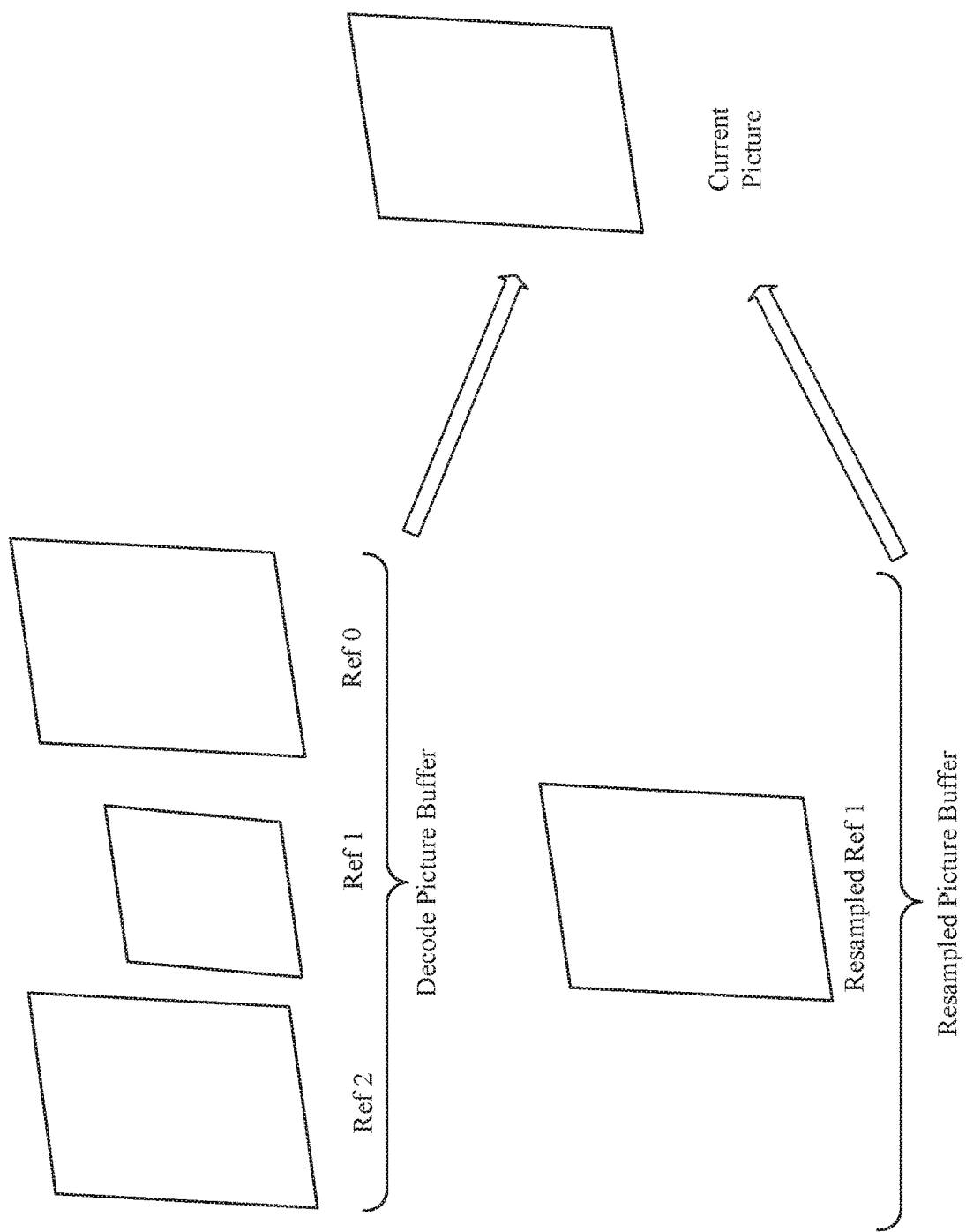
FIG. 6 illustrates an exemplary reference picture buffer, consistent with embodiments of the disclosure.

The picture-level resampling can be performed on the fly, i.e., while the current picture is predicted. In some exemplary embodiments, only original (un-resampled) reference pictures are stored in the decoded picture buffer (DPB), e.g., DPB 164 in the encoder 100 (FIG. 1) and DBP 264 in the decoder 200 (FIG. 2). The DPB can be managed in the same way as the current version of the VVC. In the disclosed picture-level resampling method, before encoding or decoding of a picture is performed, the encoder or decoder resamples the reference picture if the resolution of a reference picture in the DPB is different from the resolution of the current picture. In some embodiments, a resampled picture buffer can be used to store all the resampled reference pictures for the current picture. The resampled picture of a reference picture is stored in the resampled picture buffer and the motion search/compensation of the current picture is performed using pictures from the resampled picture buffer. After the encoding or decoding is completed, the resampled picture buffer is removed. FIG. 6 shows an example of on-the-fly picture level resampling where the low-resolution reference picture is resampled and stored in the resampled picture buffer. As shown in FIG. 6, the DPB of the encoder or decoder contains 3 reference pictures. The resolution of reference pictures "Ref 0" and "Ref 2" are the same as the resolution of the current picture. Therefore, "Ref 0" and "Ref 2" do not need to be resampled. However, the resolution of reference picture "Ref 1" is different from the resolution of current picture and therefore need to be resampled. Accordingly, only resampled "Ref 1" is stored in the reference picture buffer, while "Ref 0" and "Ref 2" are not stored in the reference picture buffer.

Consistent with some exemplary embodiments, in on-the-fly picture level resampling, the number of resampled reference pictures that a picture can use is constrained. For instance, the maximum number of resampled reference pictures of a given current picture may be preset. For example, the maximum number may be set to be one. In this case, a bitstream constraint may be imposed such that the encoder or decoder may allow at most one of the reference pictures to have a different resolution from that of the current picture, and all other reference pictures must have the same resolution. Because this maximum number indicates the size of the resample picture buffer and the maximum number of resampling that can be performed for any pictures in the current video sequence, the maximum number directly relates to the worst-case decoder complexity. Therefore, this maximum number may be signaled as part of the sequence parameter set (SPS) or the picture parameter set (PPS), and it may be specified as part of the profile/level definition.

In some exemplary embodiments, two versions of a reference picture are stored in the DPB. One version has the original resolution and the other version has the maximum resolution. If the resolution of the current picture is different from either the original resolution or the maximum resolution, the encoder or decoder can perform on-the-fly down-sampling from the stored maximum resolution picture. For the picture output, the DPB always output the original (un-resampled) reference picture.

In some exemplary embodiments, the resampling ratios can be arbitrarily chosen, and vertical and horizontal scaling ratios are allowed to be different. Because picture-level resampling is applied, the block-level operations of encoding/decoder are made agnostic to the resolutions of the reference pictures, allowing arbitrary resampling ratio to be enabled without further complicating the block-level design logics of the encoder/decoder.

In some exemplary embodiments, the signaling of the coded resolution and maximum resolution can be performed as follows. The maximum resolution of any picture in the video sequence is signaled in the SPS. The coded resolution of the picture can be signaled either in PPS or in slice header. In either case, one flag is signaled whether the coded resolution is same as the maximum resolution or not. If the coded resolution is not same as the maximum resolution, the coded width and height of the current picture are additionally signaled. If PPS signaling is used, the signaled coded resolution is applied to all pictures that refer to this PPS. If slice header signaling is used, the signaled coded resolution is only applied to the current picture itself. In some embodiments, the difference between the current coded resolution and the maximum resolution signaled may be signaled in the SPS.

In some exemplary embodiments, instead of using arbitrary resampling ratio, the resolution is restricted to a pre-defined set of N supported resolutions, where N is the number of supported resolutions within a sequence. The value of N and supported resolutions can be signaled in the SPS. The coded resolution of a picture is signaled either through the PPS or the slice header. In either case, instead of signaling the actual coded resolution, the corresponding resolution index is signaled. Table 3 (FIG. 7) shows an example of the supported resolution set, where the coding sequence allows 3 different resolutions. If the coded resolution of current picture is 1440×816, the corresponding index value (=1) is signaled either through PPS or slice header.

Figure 8:
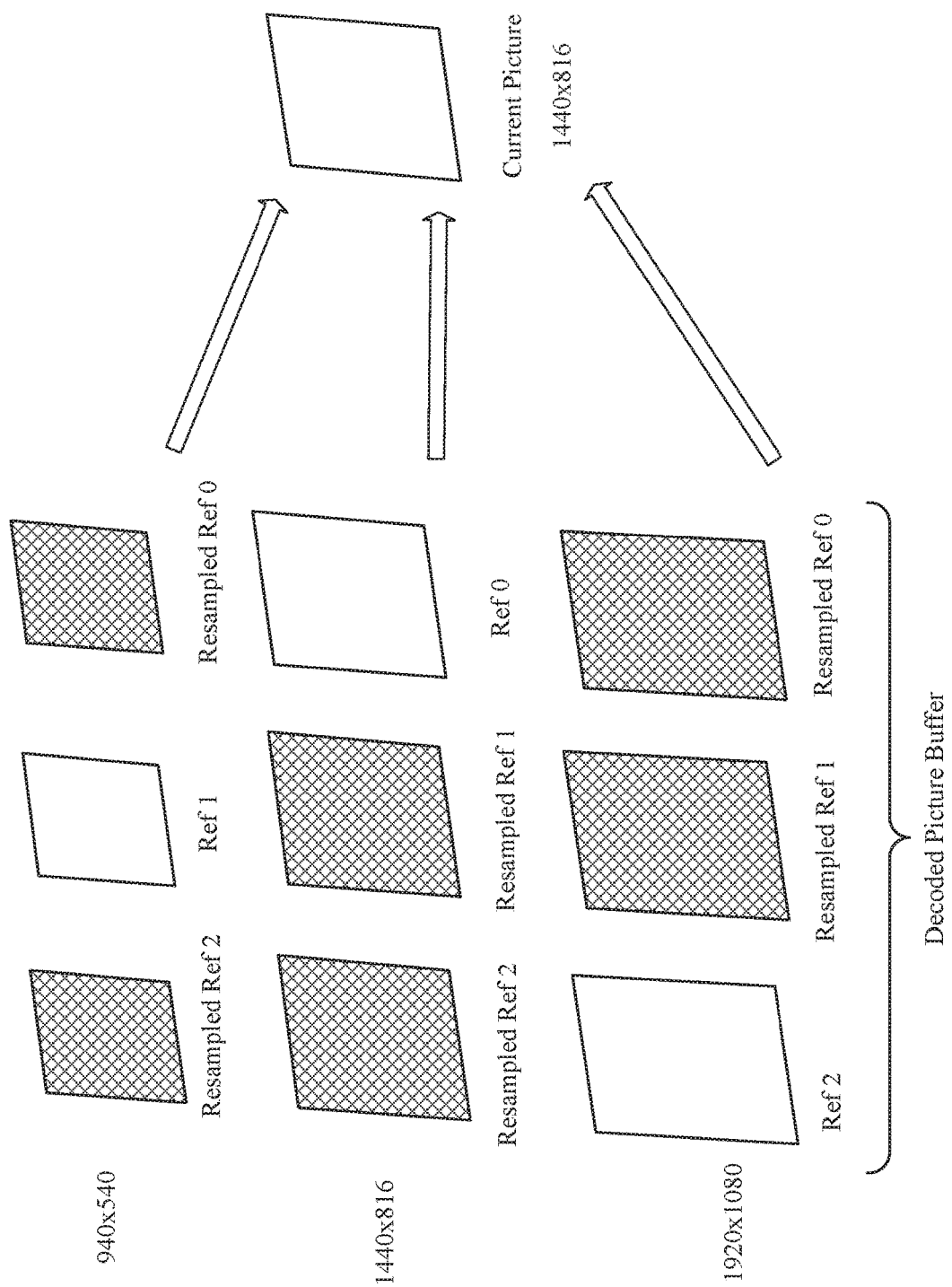
FIG. 8 illustrates an exemplary decoded picture buffer (DPB) when both resampled and original reference pictures are stored, consistent with embodiments of the disclosure.

In some exemplary embodiments, both resampled and un-resampled reference pictures are stored in the DPB. For each reference picture, one original (i.e., un-resampled) picture and N−1 resampled copies are stored. If the resolution of the reference picture is different from the resolution of the current picture, the resampled pictures in the DPB are used to code the current picture. For the picture output, the DPB outputs the original (un-resampled) reference picture. As an example, FIG. 8 shows the occupancy of a DPB of the supported resolution sets given in Table 3 (FIG. 7). As shown in FIG. 8, the DPB contains N (e.g., N=3) copies of each picture that is used as a reference picture.

The selection of the value of N depends on the application. Larger values of N make resolution selection more flexible, but increase the complexity and memory requirements. Smaller values of N are suitable for limited-complexity devices, but limit the resolutions that can be selected. Therefore, in some embodiments, flexibility can be given to the encoder to decide the value of N based on applications and device capabilities and signaled through SPS.

Figure 9:
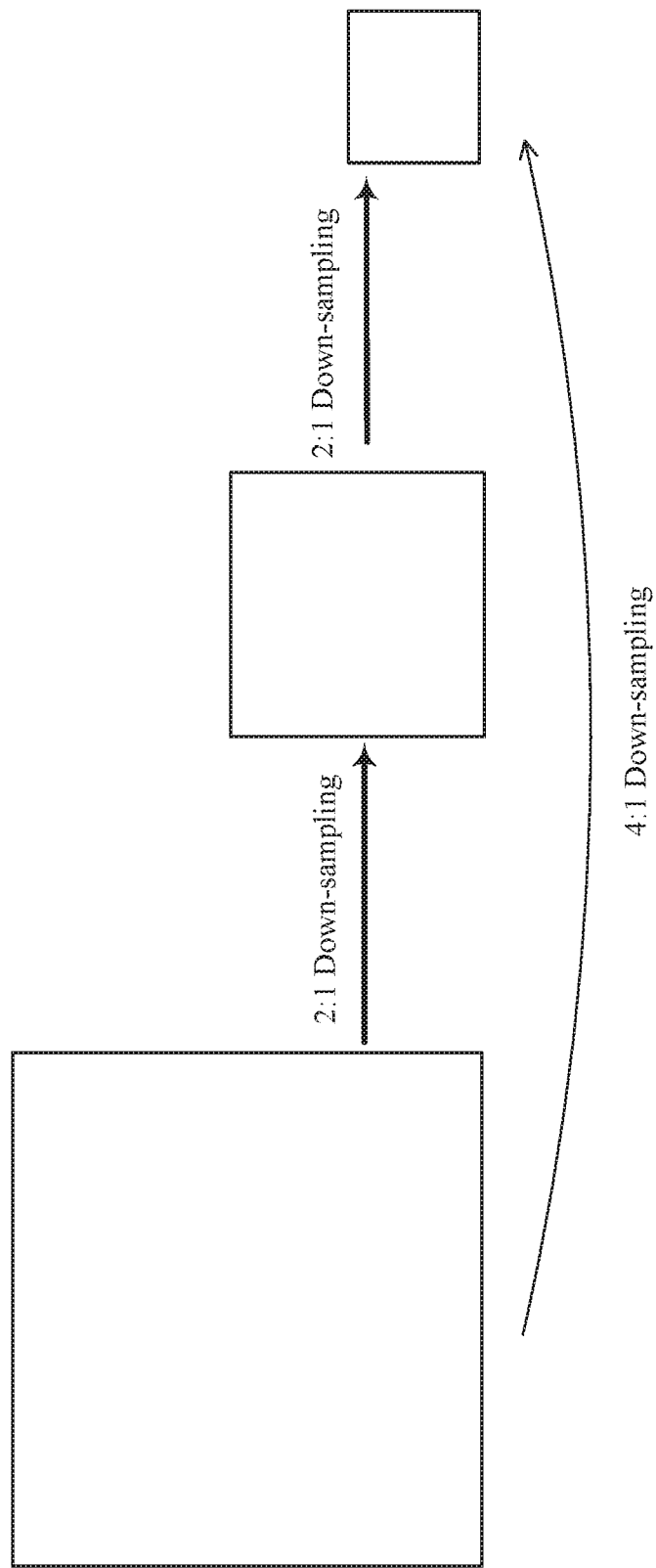
FIG. 9 illustrates progressive down-sampling, consistent with embodiments of the disclosure.

Consistent with the present disclosure, the down-sampling of reference pictures can be performed progressively (i.e., gradually). In conventional (i.e., direct) down-sampling, the down-sampling of an input image is performed in one step. If the down-sampling ratio is higher, single-step down-sampling requires longer tap down-sampling filter in order to avoid severe aliasing problem. However, longer tap filters are computationally expensive. In some exemplary embodiments, to maintain the quality of the down-sampled image, if the down sampling ratio is higher than a threshold (e.g. higher than 2:1 down-sampling), progressive down-sampling is used where down-sampling is performed gradually. For example, a down-sampling filter sufficient for 2:1 down-sampling can be applied repeatedly, to implement down-sampling ratios greater than 2:1. FIG. 9 shows an example of a progressive down-sampling where down-sampling by 4, in both horizontal and vertical dimensions, is implemented over 2 pictures. The first picture is down-sampled by 2 (in both direction) and the second picture is down-sampled by 2 (in both directions).

Consistent with the present disclosure, the disclosed picture-level resampling methods can be used together with other coding tools. For example, in some exemplary embodiments, scaled motion vector based on the resampled reference pictures can be used during temporal motion vector predictor (TMVP) or advanced temporal motion vector predictor (ATMVP).

Next, the test methodology to evaluate the coding tools for ARC is described. Since adaptive resolution change is mainly used for adapting to the network bandwidth, the following test conditions may be considered to compare coding efficiency of different ARC schemes during network bandwidth change.

Figure 10:
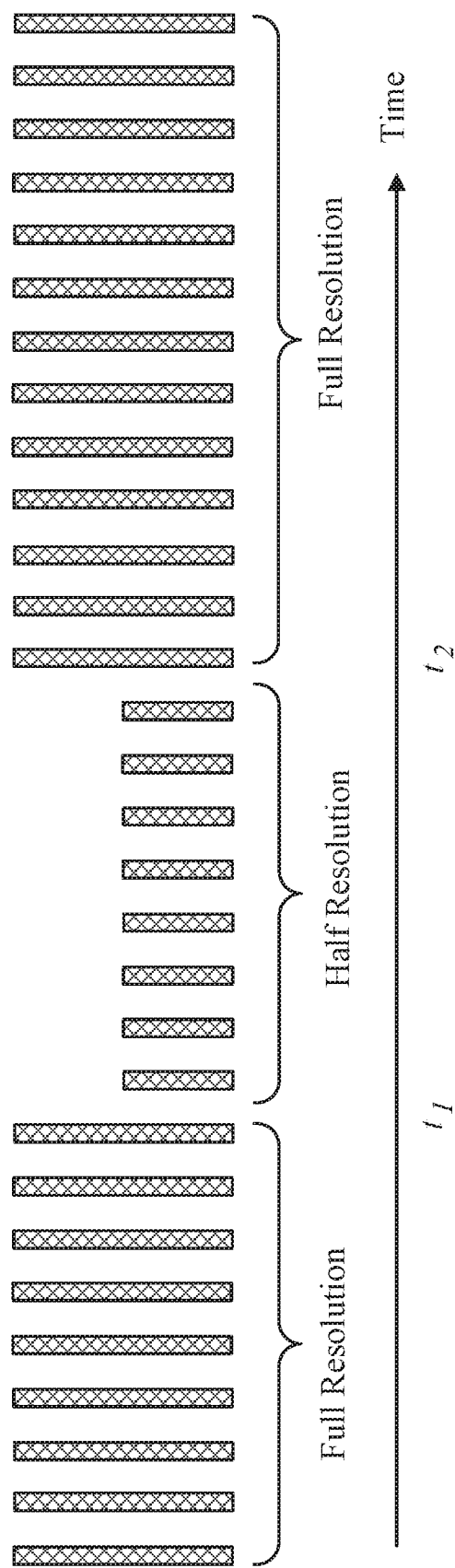
FIG. 10 illustrates an exemplary video coding process with resolution change, consistent with embodiments of the disclosure.

In some embodiments, the resolution is changed to half (in both vertical and horizontal directions) at a specific time instance and later reverted back to the original resolution after a certain time period. FIG. 10 shows the example of the resolution change. At time $t_1$ the resolution is changed to half and later reverted back to the full resolution at time $t_2$.

In some embodiments, when the resolution is reduced, if the down-sampling ratio is too large (e.g., the down-sampling ratio in a given dimension is larger than 2:1), progressive downscaling is used over a certain time period. However, when up-sampling is used, progressive up-sampling is not used.

In some embodiments, scalable HEVC test model (SMH) down-sampling filter can be used for source resampling. The detailed filter coefficients with different fractional sample positions are shown in Table 4 (FIG. 11).

Figure 12:
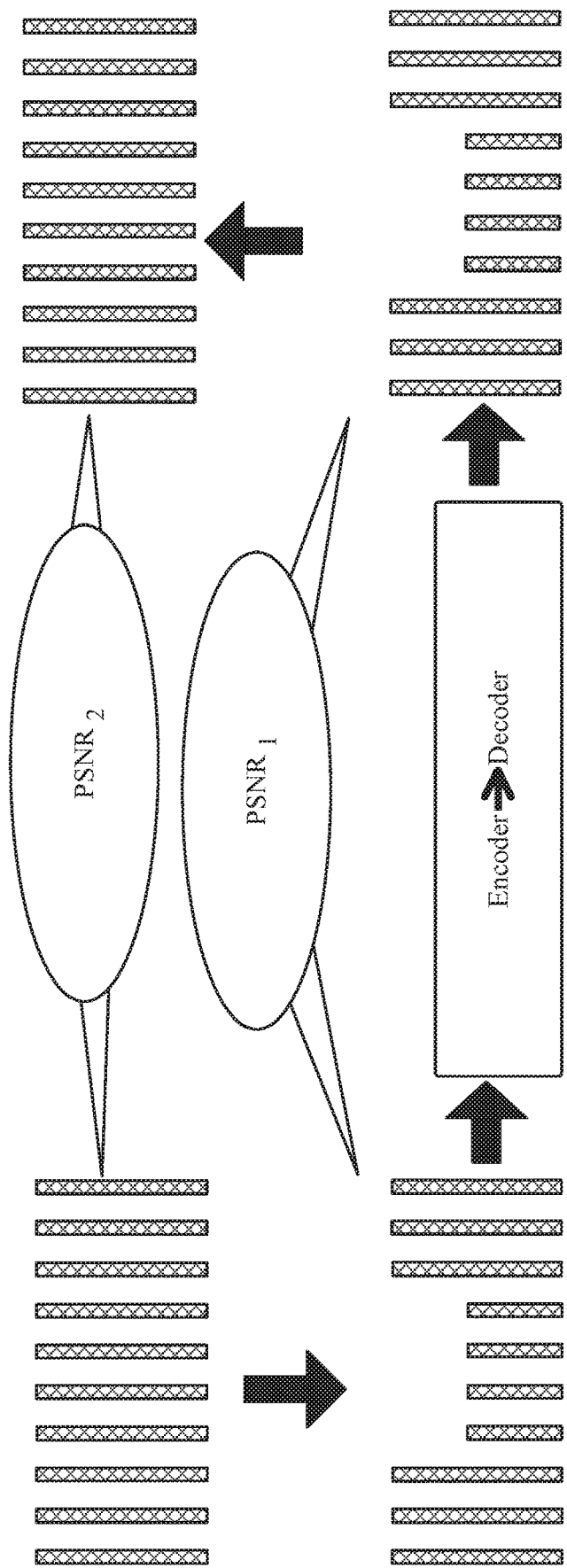
FIG. 12 illustrates an exemplary video coding process with peak-signal to noise ratio (PSNR) computation, consistent with embodiments of the disclosure.

In some exemplary embodiments, two peak-signal to noise ratios (PSNRs) are computed to measure the video quality. An illustration of the PSNR computation is shown in FIG. 12. The first PSNR is computed between resampled source and decoded pictures. The second PSNR is computed between original source and up-sampled decoded source.

In some embodiments, the number of pictures to be encoded is the same as current test conditions of VVC.

Next, the disclosed block-based resampling methods are described. In the block-based resampling, combining the resampling and motion compensated interpolation into one filtering operation may reduce the information loss mentioned above. Take the following case as an example: the motion vector of the current block has half-pel precision in one dimension, e.g., the horizontal dimension, and the reference picture's width is 2× that of the current picture. In this case, compared to the picture-level resampling, which will reduce the width of the reference picture by half to match the width of the current picture, and then doing half-pel motion interpolation, the block-based resampling method will directly fetch the odd positions in the reference pictures as the reference block at half-pel precision. In the 15$^{th}$ JVET meeting, a block-based resampling method for ARC was adopted in VVC, where the motion compensation (MC) interpolation and reference resampling is combined and performed in one-step filter. In VVC draft 6, the existing filters for MC interpolation with no reference resampling are reused for the MC interpolation with reference resampling. The same filter is used for both reference up-sampling and down-sampling. The details of filter selection are described below.

For luma component: if half-pel AMVR mode is selected and interpolated position is half-pel, a 6-tap filter [3, 9, 20, 20, 9, 3] is used; if motion compensated block size is 4×4, the following 6-tap filters as shown in Table 5 (FIG. 13) are used; and otherwise 8-tap filters as shown Table 6 (FIG. 14) are used. For chroma component, the 4-tap filters shown in Table 7 (FIG. 15) are used.

In VVC, the same filters are used for MC interpolation without reference resampling and MC interpolation with reference resampling. While the VVC MCIF is designed based on DCT up-sampling, it may not be appropriate to use it as a one-step filter combining reference down-sampling and MC interpolation. For example, for phase 0 filtering, i.e., scaled my is integer, the VVC 8-tap MCIF coefficients are [0, 0, 0, 64, 0, 0, 0, 0], which means the prediction sample is directly copied from the reference sample. While it may not be a problem for MC interpolation without reference down-sampling or with reference up-sampling, it may cause aliasing artifact for reference down-sampling case, due to the lack of low-pass filter before decimation.

This present disclosure provides methods of using cosine windowed-sinc filters for MC interpolation with reference down-sampling.

Figure 16:
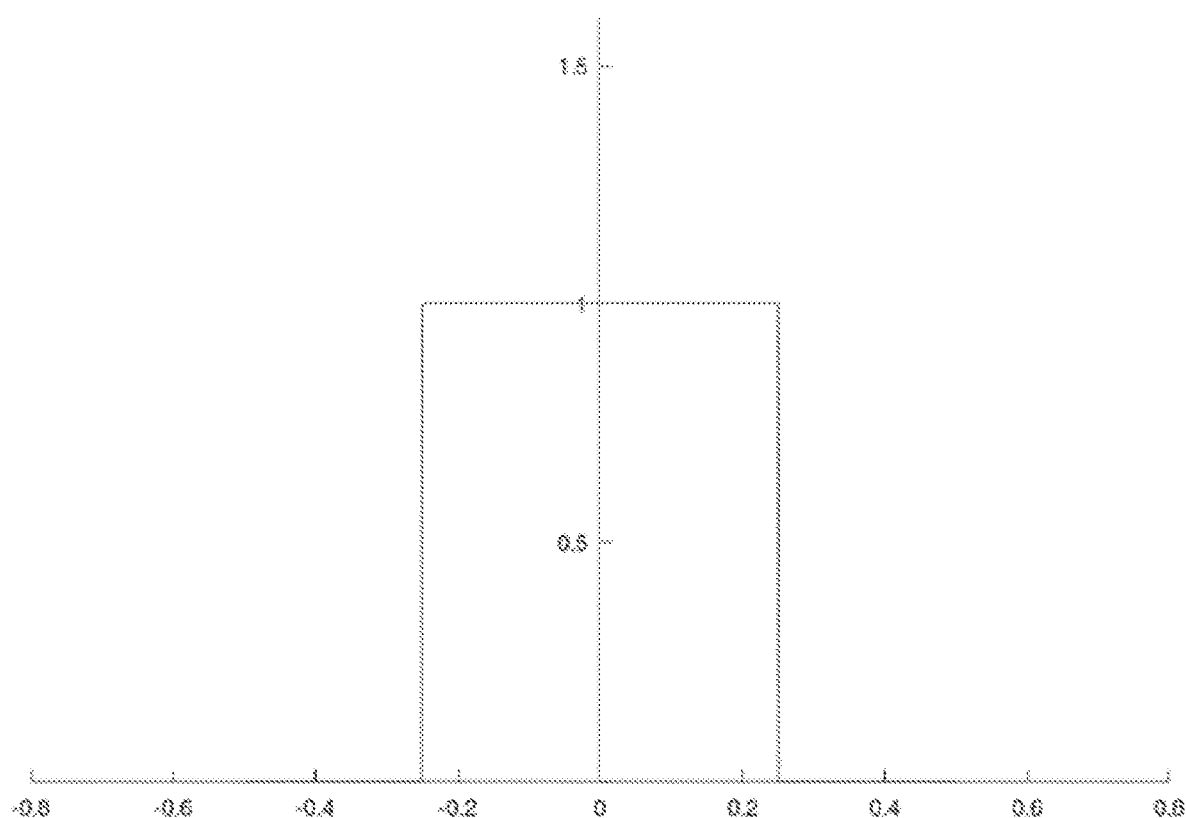
FIG. 16 is a table showing 4-tap filters, consistent with embodiments of the disclosure.

Windowed-sinc filters are band-pass filters that separate one band of frequency from others. The windowed-sinc filter is a low-pass filter with a frequency response that allows all frequencies below a cutoff frequency passthrough with amplitude 1 and stops all frequencies above the cutoff frequency with zero amplitude, as shown in FIG. 16.

The filter kernel, also known as the impulse response of the filter, is obtained by taking the Inverse Fourier Transform of the frequency response of the ideal low-pass filter. The impulse response of the low-pass filter is in the general form of a sinc function:

$$h(n) = \frac{fc}{r} \text{Sinc}\left(\frac{fc}{r}n\right), n = -\infty, \ldots, +\infty \quad (1)$$

where fc is the cut-off frequency with the value in [0, 1], r is the down-sampling ratio, i.e., 1.5 for 1.5:1 down-sampling and 2 for the 2:1 down-sampling. The sinc function is defined below:

$$\text{Sinc}(x) = \begin{cases} 1, & x = 0 \\ \frac{\sin(\pi x)}{\pi x}, & x \neq 0 \end{cases} \quad (2)$$

The sinc function is infinite. To make the filter kernel in finite length, a window function is applied to truncate the filter kernel to L points. To obtain a smooth tapered curve, a cosine-windowed function is used, which is given by:

$$w(n) = \cos\left(\frac{\pi n}{L-1}\right), n = -\frac{L-1}{2}, \ldots, \frac{L-1}{2} \quad (3)$$

The kernel of the cosine windowed-sinc filter is the product of the ideal response function h(n) and the cosine-window function w(n):

$$f(n) = h(n)w(n) = \frac{fc}{r}\text{Sinc}\left(\frac{fc}{r}n\right)\cos\left(\frac{\pi n}{L-1}\right), n = -\frac{L-1}{2}, \ldots, \frac{L-1}{2} \quad (4)$$

There are two parameters selected for a windowed-sinc kernel, the cutoff frequency fc and the kernel length L. For down-sampling filters used in the scalable HEVC test model (SHM), fc=0.9 and L=13.

Filter coefficients obtained in (4) are real numbers. Applying a filter is equivalent to calculating the weighted average of reference samples, with the weights being the filter coefficients. For efficient calculation in digital computers or hardware, the coefficients are normalized, multiplied by a scaler and rounded to integers, such that the sum of the coefficients is equal to 2^N, where N is an integer. The filtered sample is divided by 2^N (equivalent to right shift N bits). For example, in VVC draft 6, the sum of interpolation filter coefficients is 64.

In some disclosed embodiments, the down-sampling filters is used in SHM for the VVC motion compensation interpolation with reference down-sampling, for both luma and chroma components, and the existing MCIF is used for motion compensation interpolation with reference up-sampling. While the kernel length L=13, the first coefficient is small and rounded to zero, the filter length can be reduced to 12, without impact to the filter performance.

As an example, the filter coefficients for 2:1 down-sampling and 1.5:1 down-sampling are shown in Table 8 (FIG. 17) and Table 9 (FIG. 18), respectively.

Besides the value of the coefficients, there are several other differences between the designs of SHM filter and the existing MCIF.

As a first difference, the SHM filter requires filtering in integer sample position as well as in fractional sample position, while the MCIF only requires filtering in fractional sample position. An example of modification to the VVC draft 6 luma sample interpolation filtering process for reference down-sampling case is described in Table 10 (FIG. 19).

An example of modification to the VVC draft 6 chroma sample interpolation filtering process for reference down-sampling case is described in Table 11 (FIG. 20).

As a second difference, the sum of filter coefficients is 128 for SHM filters while the sum of filter coefficients is 64 for the existing MCIF. In VVC draft 6, in order to reduce the loss caused by rounding error, the intermediate prediction signals are kept in a higher precision (represented by higher bit-depth) than the output signal. The precision of the intermediate signal is called internal precision. In one embodiment, in order to keep the internal precision being the same as in VVC draft 6, the output of SHM filters needs to right shift 1 additional bit comparing to using existing MCIF. An example of modification to the VVC draft 6 luma sample interpolation filtering process for reference down-sampling case is shown in Table 12 (FIG. 21).

An example of modification to the VVC draft 6 chroma sample interpolation filtering process for reference down-sampling case is shown in Table 13 (FIG. 22).

According to some embodiments, the internal precision can be increased by 1-bit, and addition 1-bit right shift can be used to convert the internal precision to the output precision. An example of modification to the VVC draft 6 luma sample interpolation filtering process for reference down-sampling case is shown in Table 14 (FIG. 23).

An example of modification to the VVC draft 6 chroma sample interpolation filtering process for reference down-sampling case is shown in Table 15 (FIG. 24).

As a third difference, SHM filter has 12 taps. Therefore, to generate an interpolated sample, 11 neighboring samples (5 to the left and 6 to the right, or 5 above or 6 below) are needed. Comparing to MCIF, additional neighboring samples are fetched. In VVC draft 6, the chroma mv precision is 1/32. However, the SHM filter has only 16 phases. Therefore, the chroma mv can be rounded to 1/16 for reference down-sampling. This can be done by right shifting the last 5 bits of the chroma mv by 1 bit. An example of modification to the VVC draft 6 chroma fractional sample position calculation for reference down-sampling case is shown in Table 16 (FIG. 25).

According to some embodiments, in order to align to the existing MCIF design in VVC draft, we propose to use 8-tap cosine windowed-sinc filters. The filter coeff can be derived by setting L=9 in the cosine windowed-sinc function in Equation (4). The sum of filter coefficients may be set to 64 for further alignment to the existing MCIF filters. Example filter coefficients for 2:1 and 1.5:1 ratios are shown in the following Table 17 (FIG. 26) and Table 18 (FIG. 27), respectively.

According to some embodiments, to adapt to the 1/32-sample precision for chroma component, a 32-phase cosine windowed-sinc filter set may be used in chroma motion compensation interpolation with reference down-sampling. Examples of filter coefficients for 2:1 and 1.5:1 ratios are shown in Table 19 (FIG. 28) and Table 20 (FIG. 29), respectively.

According to some embodiments, for 4×4 luma block, 6-tap cosine windowed-sinc filter may be used for MC interpolation with reference down-sampling. Examples of filter coefficients for 2:1 and 1.5:1 ratios are shown in the following Table 21 (FIG. 30) and Table 22 (FIG. 31), respectively.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A computer-implemented video processing method, comprising:
   comparing resolutions of a target picture and a first reference picture;
   in response to the target picture and the first reference picture having different resolutions, resampling the first reference picture to generate a second reference picture; and encoding or decoding the target picture using the second reference picture.

2. The method according to clause 1, further comprising:
   storing the second reference picture in a first buffer, the first buffer being different from a second buffer storing decoded pictures that are used for prediction of future pictures; and
   removing the second reference picture from the first buffer after the encoding or decoding of the target picture is completed.

3. The method according to any one of clauses 1 and 2, wherein encoding or decoding the target picture comprises:
   encoding or decoding the target picture by using no more than a predetermined number of resampled reference pictures.

4. The method according to clause 3, wherein encoding or decoding the target picture comprises:
   signaling the predetermined number as part of a sequence parameter set or a picture parameter set.

5. The method according to clause 1, wherein resampling the first reference picture to generate the second reference picture comprises:
   storing a first version and a second version of the first reference picture, the first version having an original resolution, and the second version have a maximum resolution allowed for resampling the reference picture; and
   resampling the maximum version to generate the second reference picture.

6. The method according to clause 5, further comprising:
   storing the first version and the second version of the first reference picture in a decoded picture buffer; and
   outputting the first version for coding future pictures.

7. The method according to clause 1, wherein resampling the first reference picture to generate the second reference picture comprises:
   generating the second reference picture in a supported resolution.

8. The method according to clause 7, wherein further comprising:
   signaling, as part of a sequence parameter set or a picture parameter set, information indicating:
      a number of supported resolutions, and
      pixel dimensions corresponding to the supported resolutions.

9. The method according to clause 8, wherein the information comprises:
   an index corresponding to at least one of the supported resolutions.

10. The method according to any one of clauses 8 and 9, further comprising:
    setting the number of supported resolutions based on a configuration of a video application or a video device.

11. The method according to any one of clauses 1-10, wherein resampling the first reference picture to generate the second reference picture:
    performing progressive down-sampling of the first reference picture to generate the second reference picture.

12. A device, comprising:
    one or more memories storing computer instructions; and
    one or more processors configured to execute the computer instructions to cause the device to:
      compare a resolution of a target picture to a resolution of a first reference picture;
      in response to the target picture and the first reference picture having different resolutions, resample the first reference picture to generate a second reference picture; and
      encode or decode the target picture using the second reference picture.

13. A non-transitory computer readable medium storing a set of instructions that is executable by at least one processor of a computer system to cause the computer system to perform a method for processing video content, the method comprising:
    comparing resolutions of a target picture and a first reference picture;
    in response to the target picture and the first reference picture having different resolutions, resampling the first reference picture to generate a second reference picture; and
    encoding or decoding the target picture using the second reference picture.

14. A computer-implemented video processing method, comprising:
    in response to a target picture and a reference picture having different resolutions, applying a band-pass filter to the reference picture, to perform a motion compensated interpolation and to generate a reference block; and encoding or decoding a block of the target picture using the reference block.

15. The method according to clause 14, wherein the band-pass filter is a cosine windowed-sinc filter.

16. The method according to clause 15, wherein the cosine windowed-sinc filter has a kernel function $$f(n) = \frac{fc}{r} \text{Sinc}\left(\frac{fc}{r}n\right) \cos\left(\frac{\pi n}{L-1}\right), \text{ wherein } n = -\frac{L-1}{2}, \ldots, \frac{L-1}{2},$$

fc being a cutoff frequency of the cosine windowed-sinc filter, L being a kernel length, and r being a down-sampling ratio.

17. The method according to clause 16, wherein the fc is equal to 0.9 and the L is equal to 13.

18. The method according to any one of clauses 15-17, wherein the cosine windowed-sinc filter is an 8-tap filter.

19. The method according to any one of clauses 15-17, wherein the cosine windowed-sinc filter is a 4-tap filter.

20. The method according to any one of clauses 15-17, wherein the cosine windowed-sinc filter is a 32-phase filter.

21. The method according to clause 20, wherein the 32-phase filter is used in chroma motion compensation interpolation.

22. The method according to any one of clauses 14-21, wherein applying the band-pass filter to the reference picture comprises:

obtaining a luma sample or a chroma sample at a fractional sample position.

23. A device, comprising:
one or more memories storing computer instructions; and
one or more processors configured to execute the computer instructions to cause the device to:
in response to a target picture and a reference picture having different resolutions, apply a band-pass filter to the reference picture, to perform a motion compensated interpolation and generate a reference block; and
encode or decode a block of the target picture using the reference block.

24. A non-transitory computer readable medium storing a set of instructions that is executable by at least one processor of a computer system to cause the computer system to perform a method for processing video content, the method comprising:

25. A non-transitory computer readable medium storing a set of instructions that is executable by at least one processor of a computer system to cause the computer system to perform a method for processing video content, the method comprising:
comparing resolutions of a target picture and a first reference picture;
in response to the target picture and the first reference picture having different resolutions, resampling the first reference picture to generate a second reference picture; and encoding or decoding the target picture using the second reference picture.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented video processing method, comprising:
comparing resolutions of a target picture and a first reference picture, the first reference picture having at least a first version and a second version, the first version having an original resolution, and the second version having a maximum resolution allowed for resampling the first reference picture;
in response to the target picture and the first reference picture having different resolutions, resampling the second version of the first reference picture to generate a second reference picture; and
encoding or decoding the target picture using the second reference picture.

2. The method according to claim 1, further comprising:
storing the second reference picture in a first buffer, the first buffer being different from a second buffer storing decoded pictures that are used for prediction of future pictures; and
removing the second reference picture from the first buffer after the encoding or decoding of the target picture is completed.

3. The method according to claim 1, wherein encoding or decoding the target picture comprises:
encoding or decoding the target picture by using no more than a predetermined number of resampled reference pictures.

4. The method according to claim 3, wherein encoding or decoding the target picture comprises:

signaling the predetermined number as part of a sequence parameter set or a picture parameter set.

5. The method according to claim 1, further comprising:
storing the first version and the second version of the first reference picture in a decoded picture buffer; and
outputting the first version for coding future pictures.

6. The method according to claim 1, wherein resampling the first reference picture to generate the second reference picture comprises:
generating the second reference picture in a supported resolution.

7. The method according to claim 6, wherein further comprising:
signaling, as part of a sequence parameter set or a picture parameter set, information indicating:
a number of supported resolutions, and
pixel dimensions corresponding to the supported resolutions.

8. The method according to claim 7, wherein the information comprises:
an index corresponding to at least one of the supported resolutions.

9. The method according to claim 7, further comprising:
setting the number of supported resolutions based on a configuration of a video application or a video device.

10. The method according to claim 1, wherein resampling the first reference picture to generate the second reference picture comprises:
performing progressive down-sampling of the first reference picture to generate the second reference picture.

11. A device, comprising:
one or more memories storing computer instructions; and
one or more processors configured to execute the computer instructions to cause the device to:
compare a resolution of a target picture to a resolution of a first reference picture, the first reference picture having at least a first version and a second version, the first version having an original resolution, and the second version having a maximum resolution allowed for resampling the first reference picture;
in response to the target picture and the first reference picture having different resolutions, resample the second version of the first reference picture to generate a second reference picture; and
encode or decode the target picture using the second reference picture.

12. The device according to claim 11, wherein the one or more processors is further configured to execute the computer instructions to cause the device to:
store the second reference picture in a first buffer, the first buffer being different from a second buffer storing decoded pictures that are used for prediction of future pictures; and
remove the second reference picture from the first buffer after the encoding or decoding of the target picture is completed.

13. The device according to claim 11, wherein the one or more processors is further configured to execute the computer instructions to cause the device to:
encode or decode the target picture by using no more than a predetermined number of resampled reference pictures.

14. The device according to claim 13, wherein the one or more processors is further configured to execute the computer instructions to cause the device to:
signal the predetermined number as part of a sequence parameter set or a picture parameter set.

15. The device according to claim 11, wherein the one or more processors is further configured to execute the computer instructions to cause the device to:
    store the first version and the second version of the first reference picture in a decoded picture buffer; and
    output the first version for coding future pictures.

16. The device according to claim 11, wherein the one or more processors is further configured to execute the computer instructions to cause the device to:
    generate the second reference picture in a supported resolution.

17. The device according to claim 16, wherein the one or more processors is further configured to execute the computer instructions to cause the device to:
    signal, as part of a sequence parameter set or a picture parameter set, information indicating:
        a number of supported resolutions, and
        pixel dimensions corresponding to the supported resolutions.

18. A non-transitory computer readable medium storing a set of instructions that is executable by at least one processor of a computer system to cause the computer system to perform a method for processing video content, the method comprising:
    comparing resolutions of a target picture and a first reference picture, the first reference picture having at least a first version and a second version, the first version having an original resolution, and the second version having a maximum resolution allowed for resampling the first reference picture;
    in response to the target picture and the first reference picture having different resolutions, resampling the second version of the first reference picture to generate a second reference picture; and
    encoding or decoding the target picture using the second reference picture.

\* \* \* \* \*